United States Patent
Astrakhantsev et al.

(10) Patent No.: US 11,797,632 B2
(45) Date of Patent: Oct. 24, 2023

(54) IMAGE RERANKING AND PRESENTATION FOR VISUAL EXPLORATION

(71) Applicant: Microsoft Technology Licensing, LLC, Redmond, WA (US)

(72) Inventors: Nikita Astrakhantsev, Bellevue, WA (US); Parthasarathy Govindarajen, Sammamish, WA (US); Nektarios Ioannides, Seattle, WA (US); Arun Sacheti, Sammamish, WA (US); Alexander Jack Sunell, Seattle, WA (US); Avinash Vemuluru, Sammamish, WA (US); Xiaodong Fan, Bellevue, WA (US); Dong Han Wang, Bellev, WA (US); Alexandra Victoria Foote, Bellevue, WA (US); Jun Liu, Bellevue, WA (US); Elena Usinskiene, Seattle, WA (US); Diane Ash Shambaugh, Redmond, WA (US); Qianyue You, Renton, WA (US); Liang Tang, Bothell, WA (US); Souvick Sarkar, Redmond, WA (US); Jeffrey Roger Devries, Seattle, WA (US); Adam Jeffrey Curtis, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 256 days.

(21) Appl. No.: 17/188,941

(22) Filed: Mar. 1, 2021

(65) Prior Publication Data
US 2022/0277056 A1   Sep. 1, 2022

(51) Int. Cl.
*G06F 16/9538* (2019.01)
*G06F 40/14* (2020.01)
(Continued)

(52) U.S. Cl.
CPC ........ *G06F 16/9538* (2019.01); *G06F 16/538* (2019.01); *G06F 40/106* (2020.01); *G06F 40/14* (2020.01); *G06T 11/60* (2013.01)

(58) Field of Classification Search
CPC .. G06F 16/9538; G06F 40/106; G06F 16/538; G06F 40/14; G06T 11/60
See application file for complete search history.

(56) References Cited

U.S. PATENT DOCUMENTS 10,380,204 B1   8/2019  Wilson et al.
11,017,019 B1 *  5/2021  Hohwald ................. G06N 3/08
(Continued)

OTHER PUBLICATIONS

Shaun Liu, Google recipe redesign, Apr. 18, 2017, Search medium, pp. 1-14 (Year: 2017).*

(Continued)

*Primary Examiner* — Justin S Lee
(74) *Attorney, Agent, or Firm* — RAY QUINNEY & NEBEKER P.C.; Paul N. Taylor

(57) ABSTRACT

The present disclosure relates to systems, devices, and methods for a visual exploration of search engine results. The systems, devices, and methods may present, in response to receiving the search engine results for a query to perform a task, a search result webpage with a cascading waterfall layout that includes a plurality of images from a plurality of webpages included in the search results. The search result webpage may also present, adjacent to the plurality of images, structured data corresponding to a selected image from the plurality of images where the structured data includes details from the webpage to complete the task.

20 Claims, 11 Drawing Sheets

(51) Int. Cl.
  *G06F 16/538* (2019.01)
  *G06T 11/60* (2006.01)
  *G06F 40/106* (2020.01)

(56) References Cited

U.S. PATENT DOCUMENTS

| | | | | |
|---|---|---|---|---|
| 2004/0215660 | A1* | 10/2004 | Ikeda | G06F 16/532 |
| 2006/0155684 | A1* | 7/2006 | Liu | G06F 16/954 |
| 2012/0054166 | A1* | 3/2012 | Jeremias | G06F 16/58 |
| | | | | 707/706 |
| 2014/0304658 | A1* | 10/2014 | Larkina | G06F 3/04842 |
| | | | | 715/838 |
| 2015/0036883 | A1* | 2/2015 | Deri | G06V 20/52 |
| | | | | 382/103 |
| 2015/0100561 | A1* | 4/2015 | Li | G06F 16/43 |
| | | | | 707/706 |
| 2015/0161147 | A1* | 6/2015 | Zhao | G06V 20/47 |
| | | | | 382/190 |
| 2015/0170333 | A1* | 6/2015 | Jing | G06F 16/532 |
| | | | | 345/660 |
| 2015/0269231 | A1* | 9/2015 | Huynh | G06F 16/951 |
| | | | | 707/753 |
| 2015/0324394 | A1* | 11/2015 | Becker | G06F 16/5838 |
| | | | | 707/733 |
| 2016/0098426 | A1* | 4/2016 | Sayko | G06F 16/951 |
| | | | | 707/770 |
| 2016/0210289 | A1* | 7/2016 | Esinovskaya | G06F 16/248 |
| 2018/0107746 | A1* | 4/2018 | Jackson | G06F 16/9535 |
| 2019/0188231 | A1* | 6/2019 | Qin | G10L 15/22 |
| 2021/0150596 | A1* | 5/2021 | Avedissian | H04N 21/4223 |

OTHER PUBLICATIONS

Gesenhues, Amy, "Bing Gets in Shape with Search Updates for Exercise & Healthy Recipe-Related Queries", Retrieved From: https://searchengineland.com/bing-gets-shape-search-updates-exercise-healthy-recipe-related-queries-267129, Jan. 5, 2017, 4 Pages.

Nguyen, George, "Bing showing a streamlined recipe carousel in search results", Retrieved From: https://searchengineland.com/bing-showing-a-streamlined-recipe-carousel-in-search-results-319356, Jul. 11, 2019, 9 Pages.

* cited by examiner

IMAGE RERANKING AND PRESENTATION FOR VISUAL EXPLORATION

BACKGROUND

Users may use search engines for exploration to find inspirations and new ideas and to learn concepts to formulate good queries. Sometimes such explorations have a strong visual component (e.g., the user may want to know how to decorate a backyard herself). Typically, the first step is to find such ideas that are attractive and suitable for the needs of the user. Therefore, images are crucial to this type of exploration. However, only images are not sufficient because the next steps typically are to learn how to achieve this decoration, what materials are needed, how long the project takes, and/or the price for the project.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

This present disclosure addresses problems with current search engines that return images disconnected from structured data, text search results without any images, or results lacking sufficient details for a user to complete a desired task. For example, a search engine user wishing to make a lasagna dish may want to begin by looking for a lasagna image that meets the user's criteria. In this example, the user does not want to see images of lasagna dishes that don't have associated ingredient lists and recipe steps. Nor does the user want a list of lasagna recipes without any images to show the final product. As an example, the user enters a query, such as "lasagna recipe." The present system obtains an index that includes documents (e.g., webpages) that contain both a lasagna image and sufficient details to recreate the dish. In this example, the system then presents a search results pages with lasagna images from the index (e.g., in a waterfall layout) in response to a user query. If the user selects an image in this example, a corresponding details card is displayed with recipe details (e.g., ingredients). If the user does not approve of the ingredients for that recipe, the user may select a new image and the first details card is then hidden and a new details card for the new image is displayed within the search page. In this way the user may quickly and efficiently find a recipe with a desired final appearance and desired ingredients.

Some embodiments include a method for presenting structured data with search engine results on a display of a device. The method may include receiving a query from a user, wherein the query identifies a multi-step task and comprises a request for task details for completing the task. The method may include providing the query to a search engine. The method may include responsive to providing the query, receiving results from the search engine, wherein the received results include identification of a plurality of webpages, wherein each webpage of the plurality of webpages includes details to complete the task. The method may include presenting on the display a search result webpage responsive to receiving the results, the search result webpage including a plurality of images from the plurality of webpages, wherein the plurality of images are presented in a cascading waterfall layout that includes a plurality of columns. The method may include receiving a user selection of an image from the plurality of images; and responsive to the user selection: presenting, adjacent to the plurality of images on the search result webpage, structured data corresponding to the image, the structured data comprising details from the webpage to complete the task; and adjusting the presentation of the cascading waterfall layout based on the selection of the image, wherein the adjusting includes at least one of: resizing a column of the plurality of columns, and rearranging an ordering of images within at least one column of the plurality of columns.

Some embodiments include a system or device with one or more processors; memory in electronic communication with the one or more processors; and instructions stored in the memory, the instructions being executable by the one or more processors to perform any of the methods disclosed herein.

Some embodiments include a computer-readable medium storing instructions executable by a computer system or device. The computer-readable medium includes instructions for causing the computer system or device to perform any of the methods described herein.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
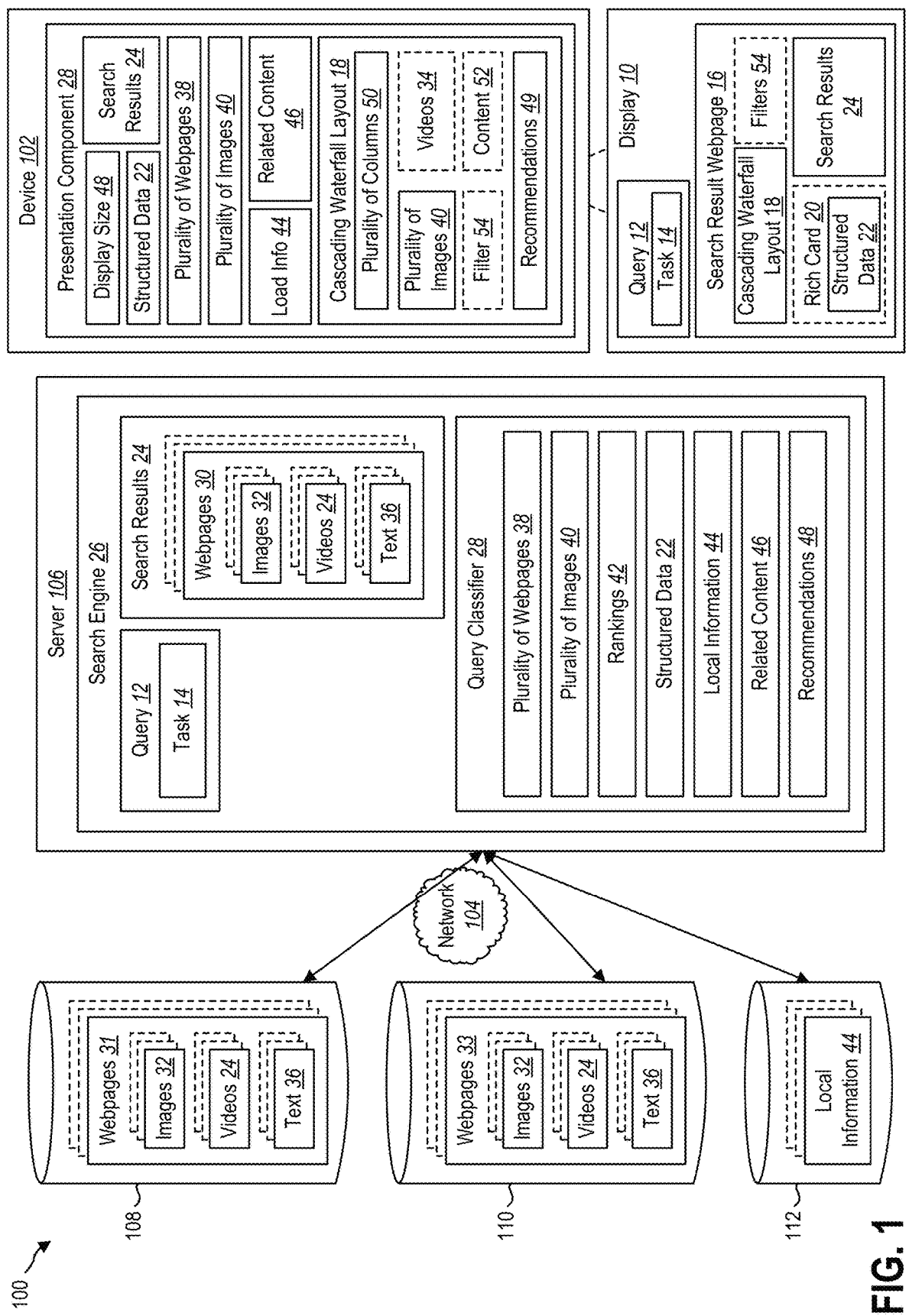
FIG. 1 illustrates an example environment for presenting search engine results for a search engine query in accordance with some embodiments of the present disclosure.

This disclosure generally relates to presenting search engine results. Users may use search engines for exploration to find inspirations and new ideas and to learn concepts to formulate good queries. Sometimes such explorations have a strong visual component (e.g., the user may want to know how to decorate a backyard herself). Typically, the first step in visual exploration is to find such ideas that are attractive and suitable for the needs of the user. Therefore, images are crucial to this type of visual exploration. However, only images are not sufficient because the next steps typically are to learn how to achieve this decoration, what materials are needed, how long the project takes, and/or the price for the project. Users may use visual exploration searches to find inspirations and new ideas. For example, users use visual exploration searches when finding recipes, do it yourself (DIY) projects, and/or making travel plans.

Existing techniques do not support exploratory image searches. Existing techniques rank images without taking into account possible ideas and/or projects behind those images and what context is important for the ideas and/or projects. As such, exploration and comparison between different ideas and/or projects is difficult using existing techniques. Users either constantly need to switch between image searching (to get overall understanding of the idea and/or the project), source webpages (to understand needed materials, ingredients, and/or time), and web searches (to search for similar ideas based on terms found on source pages or to learn about those materials/ingredients and other specifics of ideas). Alternatively, users must choose one way of information presentation (either images or texts), and thus, reducing effectiveness of the exploration.

This disclosure provides methods and devices for providing better context for comparing ideas (recipes, travel destinations, DIY projects, etc.) by showing not only images, gifs, and/or videos for search results for a task, but also relevant page information using structured data extracted from the webpage associated with the images. The structured data may include, for example, a title of the webpage, a uniform resource locator (URL) for the webpage, ingredients, materials, time needed for the recipe or the project, and/or rich metadata extracted from the webpage. The presentation provided by the methods and devices may include a cascading waterfall layout with a plurality of images. The plurality of images may be associated with a plurality of webpages that include details for completing the task. The plurality of webpages may be included in search results returned by a search engine in response to a query for the task. The cascading waterfall layout is concise enough to allow quick comparison and exploration of the ideas. The cascading waterfall layout may be presented at a top portion of a search result webpage above the general search results returned by the search engine for a query. This disclosure includes several practical applications that provide benefits and/or solve problems associated with presenting search engine results.

The methods and devices may determine to trigger the cascading waterfall layout of images, videos, and/or gifs based on the query provided by the user. The methods and devices may use a trained machine learning model to determine whether to trigger the presentation of the cascading waterfall layout. The machine learning model may be trained based on fully supervised data (labeled by humans) or by weakly supervised data of search engine logs to extract images searches where users are interested in the source pages, not only in the images, based on whether the user clicks on pages more often than the images from the search engine logs. The user clicking on the source pages may indicate that the query has visual exploration intent (exploration because of clicking on the webpages may indicate interest in additional context and/or related information) and visual intent because the query was issued to an image search, not a web search. If the machine learning model determines that the query includes a visual intent, the presentation of the cascading waterfall layout of images may be triggered.

The methods and devices may determine which images, videos, and/or gifs to include in the cascading waterfall by using a ranking based on a weighted combination of aspects. For example, the image relevance to the task, image attractiveness, and/or page usefulness may go into the ranking. The results of the ranking may be deduplicated based on image content. For exploratory queries, higher weights may be assigned to page related aspects and idea-based deduplication may be applied. For example, if there are multiple images for the same idea of garage decoration (e.g., just photographed from different angles), only one image per idea may be shown or the ideas may be grouped and shown with multiple images with the same context information. The order of images presented in the cascading waterfall may be also specific (e.g., for DIY projects the order of images presented may be a logical order of steps to complete the project). The methods and devices may also integrate a visual search where users search by images (e.g., exploring ideas with similar look, such as, bedrooms in similar styles, colors) in determining which images to include in the cascading waterfall layout.

As such, the methods and devices may optimize the search experience for visual exploration searches by improving the user experiences for web and/or image searches. The methods and devices may be used to visually represent search engine results by providing a cascading waterfall layout of images that is concise enough to allow quick visual comparison and exploration of the ideas presented in the cascading waterfall layout. The user may quickly browse more ideas by reviewing the structured data for different images selected from the cascading waterfall layout without having to redirect to the webpages associated with the selected images. Users may use the methods and devices to make more accurate and/or more informed decisions for determining which webpages to visit provided in a search result.

Referring now to FIG. 1, illustrated is an example environment 100 for presenting search engine results. Environment 100 may include one or more devices 102 in communication with one or more servers 106 via a network 104. The one or more devices 102 may be used by users to enter queries 12 for searching different webpages for a task 14 and/or performing a visual exploration of one or more tasks 14. For example, the user may enter the queries 12 on a search webpage presented on a display 10 in communication with the device 102.

The queries 12 may be visual searches for upcoming projects, cooking activities, and/or vacations. The queries 12 may also be exploration searches for new ideas and/or recommendations. The users may provide text describing the tasks 14 in the queries 12. The queries 12 may identify a task 14 and/or may include a request for task details for completing the task 14. The tasks 14 may be multi-step tasks, such as, but not limited to, DIY projects, cooking, and/or trip planning.

The device 102 may provide the query 12 for the task 14 to a search engine 26 that searches one or more datastores 108, 110 with a plurality of webpages 31, 33 in response to the received query 12. The webpages 31, 33 may include a plurality of images 32, a plurality of videos 34, and/or a plurality of text 36. The one or more datastores 108, 110 may store webpages 31, 33 published from the same content provider or may store webpages 31, 33 published from different content providers. For example, webpages 31 from a first content provider are stored in datastore 108 and webpages 33 from the first content provider are stored in datastore 110. Another example may include webpages 31 a first content provider are stored in datastore 108 and webpages from a second content provider are stored in datastore 110. Another example may include webpages 31 from a first content provider and a second content provider are stored in datastore 108 and webpages 33 from a third content provider and a fourth content provider are stored in datastore 110.

The search engine 26 may generate search results 24 that identify a plurality of webpages 30 from the datastores 108, 110 that discuss the task 14, include details to complete the task 14, and/or may be relevant to the task 14. The search engine 26 may also generate textual search results 24 with a plurality of search results for the query 12. The webpages 30 included in the search results 24 may include a plurality of images 32, a plurality of videos, and/or a plurality of text 36.

A query classifier 29 may perform further processing on the search results 24 to determine which images 32 and/or which webpages 30 from the search results 24 to present for the task 14 in response to the query 12. The query classifier 29 may be a trained machine learning model that analyzes the search results 24 and the query 12 to determine which webpages 30 and/or images 32 of the search results 24 to present for the task 14.

The query classifier 29 may be trained based on human labeled data or by weakly supervised data for a specific segment or domain for the query classifier (e.g., recipes, DIY, travel plans). As such, different query classifiers 29 may be selected for analyzing the search results 24 based on the segment or domain of the task 14. The segment or domain (e.g., recipes, DIY, travel plans) of the task 14 may be predicted by another query classifier trained on human labeled data. The query classifier 29 may be trained based on fully supervised data (labeled by humans) or weakly supervised data for more than one segments and/or domains. The query classifier 29 may identify a plurality of images 40 to present and/or a plurality of webpages 38 to present from the search results 24. As such, a subset of the images 32 and/or the webpages 30 provided in the search results 24 may be selected for presentation in response to the query 12.

The query classifier 29 analyzes a quality of the images 32 in determining whether to include the images 32 in the plurality of images 40 to present. The quality of the image 32 may include, for example, attractiveness of the images, and/or the relevance of the image to the query 12 and/or the task 14. If the quality of the image 32 is above a threshold level, the image 32 is included in the plurality of images 40 to present. The query classifier 29 may also analyze a quality of the webpages 30 associated with the images 32 in determining whether to include the images 32 in the plurality of images 40 to present and/or include the webpages 30 in the plurality of webpages 38 to present. The quality of the webpages 30 may include, for example, an authoritativeness of the webpages 30 and/or a source of the webpages 30. If the quality of the webpages 30 is high (e.g., the webpage is from an approved source or an authenticated source), the webpage 30 is included in the plurality of webpages 38 to present. If the quality of the webpages 30 is low (e.g., the webpage is from an unauthenticated source), the webpage 30 is not included in the plurality of webpages 38 to present. The query classifier 29 may use both the quality of the images 32 and the quality of the webpages 30 in determining the plurality of images 40 to display with the search results 24 in response to the query 12.

The query classifier 29 may group the plurality of images 40 from the search results 24 according to ideas, projects, and/or travel destinations associated with the images 32. Groupings of the plurality of images 40 may be based on the webpage 38 associated with the images 40. In addition, grouping of the plurality of images 40 may be by a special aggregation method where if the same idea or the same travel destination is described in multiple webpages 38, the plurality of images 40 may be aggregated into one group. If multiple ideas are described in the same webpage 38, the different ideas may be extracted and multiple groups formed for the plurality of images 40.

The query classifier 29 may extract structured data 22, such as, meta-information related to the grouped images. The structured data 22 may include, but is not limited to, recipes, prices, user ratings, reviews, a uniform resource locator (URL) link to the webpage, the webpage name steps for performing the task 14, step-by-step images for performing the task 14, an instructional video for performing the task 14, a list of materials needed for performing the task 14, an estimated time required to complete the task 14, direct links to a portion of the webpage where the task 14 is described, an aggregate of information from different webpages for the task 14 (additional images, steps, materials description, etc.), substitute materials for the task 14, and/or local information 44 associated with the task 14.

The structured data 22 extraction may be performed on the plurality of webpages 38 associated with the plurality of images 40. As such, the structured data 22 may be extracted from the plurality of webpages 38. In addition, the structured data 22 extraction may occur from sources separate from the plurality of webpages 30. Thus, the structured data 22 may be extracted from sources other than the plurality of webpages 30 and/or extracted from the plurality of webpages 38. The structured data 22 extraction may be performed by rule-based methods (e.g., pre-specified patterns for specific segments like recipes) or machine learning based methods based on manually labeled data. In addition, the structured data 22 extraction may use an existing knowledge base for particular segments or domains (e.g., recipes, DIY, recipes).

The structured data 22 may include local information 44 associated with the task 14. Examples of local information 44 include, but are not limited to, estimated cost of materials for the task 14, local availability of materials for the task 14, local cost of materials for the task 14, and/or a store to purchase the materials for the task 14 located nearby a location of the device 102. The local information 44 may be provided from a third party datastore 112 that stores the local information 44. As the local information 44 changes and/or is updated (e.g., availability of materials change or inventory at the stores changes), the local information 44 may be updated in the third party datastore 112.

The query classifier 29 may apply one or more rankings 42 to the plurality of webpages 38. The rankings 42 may be used to determine an order for presenting the plurality of webpages 38 and/or a plurality of images 40 associated with the plurality of webpages 38. The rankings 42 may be applied to the groups of the plurality of images 40. For example, the query classifier 29 takes a max or sum of clicks for each image in the plurality of images 40 or takes features of the most dominant image of the plurality of images 40 if aggregation for a particular feature is not desirable. The query classifier 29 may append the rankings 42 to the plurality of images 40 and/or the plurality of webpages 38.

The rankings 42 may also take into account the extracted structured data 22. If the plurality of webpages 38 have rich, relevant, and/or use case specific (e.g., having positive user reviews) structured data 22, then the rankings 42 for the plurality of webpages 38 may be higher relative to the plurality of webpages 38 with less structured data 22 or less rich structured data 22. In some embodiments, the webpages 38 may include a video describing the task details. For example, videos may include instructional videos, such as, a YouTube instructional video. The query classifier 29 may apply a higher ranking 42 to webpages 38 with instructional videos for the task 14 as compared to webpages 38 with limited instructions for the task 14. The query classifier 29 may appending feature vectors extracted for the structured data 22 with the rankings 42 information.

The search engine 26 may send the search results 24 to the device 102 for presentation on the display 10. The search engine 26 may also send to the device 102 the identified plurality of webpages 38 that include details and/or information for completing the task 14. The search results 24 may be based on the general search index for the task 14. The information included in the search results 24 may be different from the information included in the identified plurality of webpages 38. For example, different webpages, videos, and/or articles related to the task 14 may be include in the general search results 24 as compared to the plurality of webpages 38. In addition, the information included in the search results 24 may be the same as the information included in the plurality of webpages 38. For example, the same webpages may be included in the search results 24 as the plurality of webpages 38 included in the cascading waterfall layout 18. Another example may include the same videos 34 included in the search results 24 and the cascading waterfall layout 18.

The device 102 may have a presentation component 28 that determines a presentation of the received search results 24, the plurality of webpages 38 and/or associated plurality of images 40, and/or any received structured data 22 for the plurality of webpages 38.

The presentation component 28 may generate a cascading waterfall layout 18 to present the plurality of images 40 for the identified plurality of webpages 38. The plurality of images 40 may include, for example, images, gifs, and/or videos. The number of images included in the identified plurality of images 40 may be a predetermined or preset number of images. For example, the cascading waterfall layout 18 may include fifty images for the task 14.

The presentation component 28 may determine to trigger the presentation of the cascading waterfall layout 18 based on the query 12 provided by the user. The presentation component 28 may use a trained machine learning model to determine whether the query includes a visual intent. The machine learning model may be trained using fully supervised data (labeled by humans) or weakly supervised data of search engine logs to extract images searches where users are interested in the source pages, not only in the images, based on whether the user clicks on pages more often than the image from the search engine logs. The user clicking on the source pages may indicate that the query has visual exploration intent (exploration because of clicking on the webpages may indicate interest in additional context and/or related information) and visual intent because the query was issued to an image search, not a web search. The trained machine learning model may also be trained on image intent using human labeled data. The query classifier 29 may be trained to determine an image intent in a query 12 and select whether the present the cascading waterfall layout 18 based on the image intent of the query 12. The presentation component 28 may use the trained machine learning model to determine that the query 12 includes a visual aspect and/or is a visual exploration search and may trigger the presentation of the cascading waterfall layout 18.

The cascading waterfall layout 18 may include a plurality of columns 50 for presenting the plurality of images 40. The width of the plurality of columns 50 may be based on the image result sizes and/or the display size 48 of the device 102. In addition, the width of the plurality of columns 50 may be a fixed size. The number of columns included in the plurality of columns 50 may be based on the display size 48 of the device 102. For example, devices 102 with a larger display size 48 may have more columns included in the plurality of columns 50 as compared to devices 102 with a smaller display size 48. The number of rows included in the cascading waterfall layout 18 may be selected based on the display size 48 and/or the size of the images. If the plurality of images are landscape-oriented with a small height, more rows may be selected relative to images with a larger height. As such, the presentation of the cascading waterfall layout 18 may differ between devices 102 with different display sizes 48.

The presentation component 28 may place the plurality of images 40 into the plurality of columns 50 using the rankings 42. The presentation component 28 may also use information about the presentation of the plurality of images 40 in the webpages 38 in determining the order for presenting the plurality of images 40. For example, a hierarchical organization of the webpage 38 may be used to understand which level to keep an image (e.g., a first image from each section after filtering out irrelevant images or an order of images in a DIY segment). As such, the original order of the images in the webpages 38 may be used in determining how to present the plurality of images 40.

The presentation component 28 may start with a first image from the plurality of images 40 and place the image into a first column of the plurality of columns 50. A next image from the plurality of images 40 is placed into a second column of the plurality of columns 50. The image placement continues until one image is placed per column. The images may have different sizes and the images per column may differ in size.

The presentation component 28 may calculate which column has a least number of pixels from the top of the search result webpage 16 and places a next image from the plurality of images 40 into the identified column. The presentation component 28 may continue to calculate which column has a least number of pixels from the top of the search result webpage 16 and place a next image into the identified column until a predetermined number of images are presented in the cascading waterfall layout 18. The predetermined number of images may present an initial subset of the plurality of images 40 to include in the cascading waterfall layout 18. For example, if the plurality of images 40 includes 50 images for the task 14, the predetermined number for the subset of initial images presented may be 20 or 30 images. The predetermined number of images may be based on the display size 48 of the device 102. Devices 102 with smaller display sizes 48 may present 20 images in the cascading waterfall layout 18 and devices 102 with larger display sizes 48 may present 30 images in the cascading waterfall layout 18. As such, the presentation component 28 may fill up the cascading waterfall layout 18 with images based on a combination of the rankings of the images 40 and the display requirements of the device 102.

The plurality of images 40 initially presented in the cascading waterfall layout 18 may be the images with a highest ranking 42. For example, if materials mentioned for a DIY task 14 from one of the plurality webpages 38 are not available locally, the associated image for that webpage may not be included in the initial subset of images. Another example may include adding an image from a webpage of the plurality of webpages 38 to the plurality of images 40 that has step-by-step images for the DIY task 14 described in the webpage.

A user may select to see more and/or less images than the initial images displayed in the cascading waterfall layout 18. For example, a user may select an icon to see more images. The presentation component 28 may adjust the presentation of the cascading waterfall layout 18 to include more images from the plurality of images 40. For example, the size of the images are resized to include more images presented per row. Another example may include adding more rows of images so a user may scroll through the rows of additional images.

A user may also select one image of the plurality of images 40 presented in the cascading waterfall layout 18. For example, the user may want to review the image further or obtain additional information for the image. The presentation component 28 may present the structured data 22 associated with the webpage for the selected image. The structured data 22 may be presented adjacent to the cascading waterfall layout 18. In some embodiments, the presentation component 28 may present the structured data using a rich card 20. By presenting the structured data 22 next to the cascading waterfall layout 18 on the same search result webpage 16, users may make more informed decisions about whether to go to the source webpage for the selected image.

The presentation component 28 adjusts the presentation of the cascading waterfall layout 18 based on the selection of the image so that the structured data 22 is presented next to the cascading waterfall layout 18. Adjusting the presentation of the cascading waterfall layout 18 may include, for example, resizing a column of the plurality of columns 50, reducing a number of columns of the plurality of columns 50, rearranging an ordering of the images within at least one column of the plurality of columns 50, rearranging a position of the images within the plurality of columns 50, and/or resizing the images within the plurality of columns 50. As such, the cascading waterfall layout 18 has an adaptive arrangement of columns based on available screen real estate and responsive design.

The presentation component 28 adjusts the presentation of the cascading waterfall layout 18 without issuing a new search request to the search engine 26 and/or changing the query 12 from the user. If a user selects a different image from the plurality of images 40, the presentation component 28 may replace the structured data 22 presented with the structured data 22 for the webpage associated with the different image. The user may view different structure data 22 for different images selected from the plurality of images 40 without issuing a new search to the search engine 26 or changing the query 12 from the user, resulting in an improvement of the search result webpage 16 by not having to refresh the entire search result webpage 16 each time a new image is selected. As such, the user may easily switch between the structured data 22 for different images selected resulting in quick and easy comparison of the different tasks 14 for the selected images. Moreover, the user may quickly browse more ideas by reviewing the structured data 22 for different images selected without having to redirect to the webpages associated with the selected images.

In some embodiments, the presentation component 28 may present recommendations 49 with the structured data 22 based on the selected image. The recommendations 49 are optionally included in the same rich card 20 as the structured data 22, or adjacent to it. The recommendations 49 may include similar content to the content expressed in the selected image and/or the content expressed in the associated webpage. The recommendations 49 may not be included in the cascading waterfall layout 18 but may be obtained in response to a new query constructed based on the selected image.

In some embodiments, the presentation component 28 may present one or more videos 34 for the task 14 with the plurality of images 40 in the cascading waterfall layout 18. The videos 34 may describe task details, such as, but not limited to, an instructional video, a video showing the completed project, and/or a YouTube instructional video. The videos 34 may have visually distinct display attributes (e.g., a different border, includes an overlay with a play button) from display attributes of the plurality of images 40. In some embodiments, when the user selects the video 34 from the cascading waterfall layout 18, the selected video 34 may start playing in an overlay above the cascading waterfall layout 18 nearby the display attributes for the selected video 34.

In some embodiments, the presentation component 28 may present recommendations 49 and/or advertising with the plurality of images 40 and/or one or more videos 34 in the cascading waterfall layout 18. The recommendations 49 may include similar content to the content expressed in the selected image and/or the content expressed in the associated webpage. The recommendations 49 may provide categories or suggestions that a user may select for additional ideas for the task 14 and/or suggestions for different tasks 14. The recommendations 49 may have visually distinct display attributes (e.g., different border, different shading, overlays with the categories) from display attributes of the videos 34 and/or the display attributes of the plurality of images 40.

In some embodiments, the presentation component 28 may present additional content 52 with the plurality of images 40 and/or one or more videos 34 in the cascading waterfall layout 18. The additional content 52 may include articles discussing the task 14. The additional content 52 may have visually distinct display attributes (e.g., different border or different shading) from display attributes of the videos 34 and/or the display attributes of the plurality of images 40.

The search result webpage 16 may include one or more filter options 54 for filtering the cascading waterfall layout 18 based on the structured data 22 associated with each image of the plurality of images 40. Filters 54 may include, but are not limited to, cost, time, materials, categories, and/or ingredients. The presentation component 28 may adjust the presentation of the cascading waterfall layout 18 based on the one or more filters 54 selected. For example, the presentation component 28 may remove one or more images from the plurality of images 40 based on the selected filters 54. As such, the presentation may dynamically filter the images 40 included in the cascading waterfall layout 18 based on the selected filters 54.

The search result webpage 16 may present the cascading waterfall layout 18 with the initial set of images of the plurality of images 40 and the search results 24. In some embodiments, the search results 24 are presented below the cascading waterfall layout 18. As such, the cascading waterfall layout 18 is presented in a top portion of the search result webpage 16 and the search results 24 are presented in a lower portion of the search result webpage 16.

In some embodiments, one or more computing devices (e.g., servers 106 and/or device 102) is used to perform the processing of environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the search engine 26, the query classifier 29, and/or the presentation component 28 is implemented wholly on the same computing device. Another example includes one or more subcomponents of the search engine 26, the query classifier 29, and/or the presentation component 28 is implemented across multiple computing devices. Moreover, in some embodiments, the search engine 26 and/or the query classifier 29 may be implemented are processed on different server devices of the same or different cloud computing networks.

In some embodiments, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular embodiment. In some embodiments, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some embodiments, the components of the environment 100 include hardware, such as a special purpose processing device to perform a certain function or group of functions. In some embodiments, the components of the environment 100 include a combination of computer-executable instructions and hardware.

As such, environment 100 may be used to visually represent search engine results by providing a cascading waterfall layout 18 of search engine results that is concise enough to allow quick visual comparison and exploration of the ideas presented in the cascading waterfall layout 18. Moreover, the user may quickly browse more ideas by reviewing the structured data 22 for different images selected from the cascading waterfall layout 18 without having to redirect to the webpages associated with the selected images. As such, users may use environment 100 to make more accurate and/or more informed decisions for determining which webpages to visit provided in a search result.

Figure 2:
FIG. 2 illustrates an example graphical user interface of a webpage displaying a cascading waterfall layout with a plurality of images for a do it yourself (DIY) project and structured data for a selected image in accordance with some embodiments of the of the present disclosure.

Referring now to FIG. 2, illustrated is an example graphical user interface 200 displayed in a search result webpage 16 (FIG. 1) on a display 10 (FIG. 1) of a device 102 (FIG. 1). A user may enter in a query 204 for "DIY mason jar" in the search box 202. The DIY project (DIY mason jar) may be a multi-step task. The query 204 may include a request for details for completing the DIY project (DIY mason jar).

The presentation component 28 (FIG. 1) may provide a cascading waterfall layout 208 that includes a plurality of images 40 (FIG. 1) from a plurality of webpages 38 (FIG. 1) that include details for DIY mason jar projects returned from a search engine 26 (FIG. 1). The cascading waterfall layout 208 may correspond to the cascading waterfall layout 18 discussed in FIG. 1. The cascading waterfall layout 208 may include four columns of images. The size of the plurality of images displayed in the cascading waterfall layout 208 may differ between rows and/or columns. The columns may be a fixed size and the number of columns may be selected based on a display size 48 (FIG. 1) of the display 10. The cascading waterfall layout 208 includes three rows for displaying the plurality of images. The number of rows may be selected based on the display size 48 and/or the sizes of the images. If the plurality of images are landscape-oriented with a small height, more rows may be selected relative to images with a larger height. In addition, the size of the plurality of images displayed in the cascading waterfall layout 208 may change based on the display size 48. The cascading waterfall layout 208 may be presented differently on devices 102 with different display sizes 48 (e.g., a different number of columns and/or rows may be presented). As such, the cascading waterfall layout 208 has an adaptive arrangement of columns based on available screen real estate, the size of the images, and/or responsive design.

A user may select an image 218 from the plurality of images in the cascading waterfall layout 208 to explore more. Adjacent to the cascading waterfall layout 208, structured data 210 for a selected image 218 is presented. The structured data 210 includes an image 212 for "how to make a mason jar herb garden." The image 212 provides additional details and/or an overview of the DIY mason jar project discussed in the webpage for the selected image 212. The structured data 210 also includes a URL 214 to the webpage for the selected image 218. The structured data 210 also includes a plurality of images 216 showing step by step details for completing the task for how to make a mason jar herb garden.

The search engine 26 (FIG. 1) may provide one or more filter options 206 for different DIY mason jar tasks. The filter options 206 may include different categories (e.g., decor, Christmas, centerpieces, painted, ideas, projects, crafts, lanterns, snow globe, candles, gifts, and/or glitter) for DIY mason jar tasks. If the user clicks on any of the filter options 206, the presentation of the cascading waterfall layout 208 may be adjusted to only include images associated with the selected filter option 206.

Figure 3:
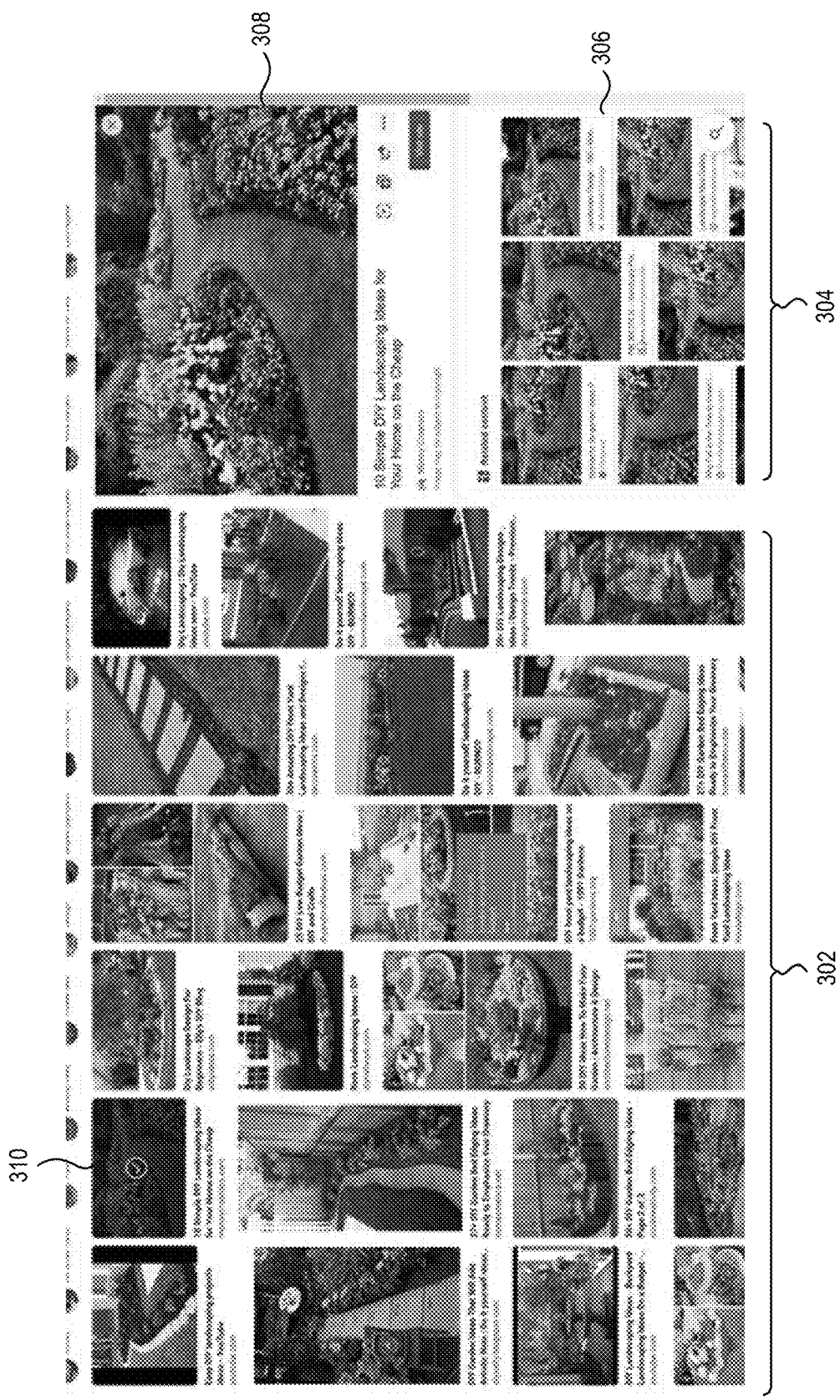
FIG. 3 illustrates another example graphical user interface of a webpage displaying a cascading waterfall layout with a plurality of images for a DIY project and structured data for a selected image in accordance with some embodiments of the present disclosure.
Figure 4:
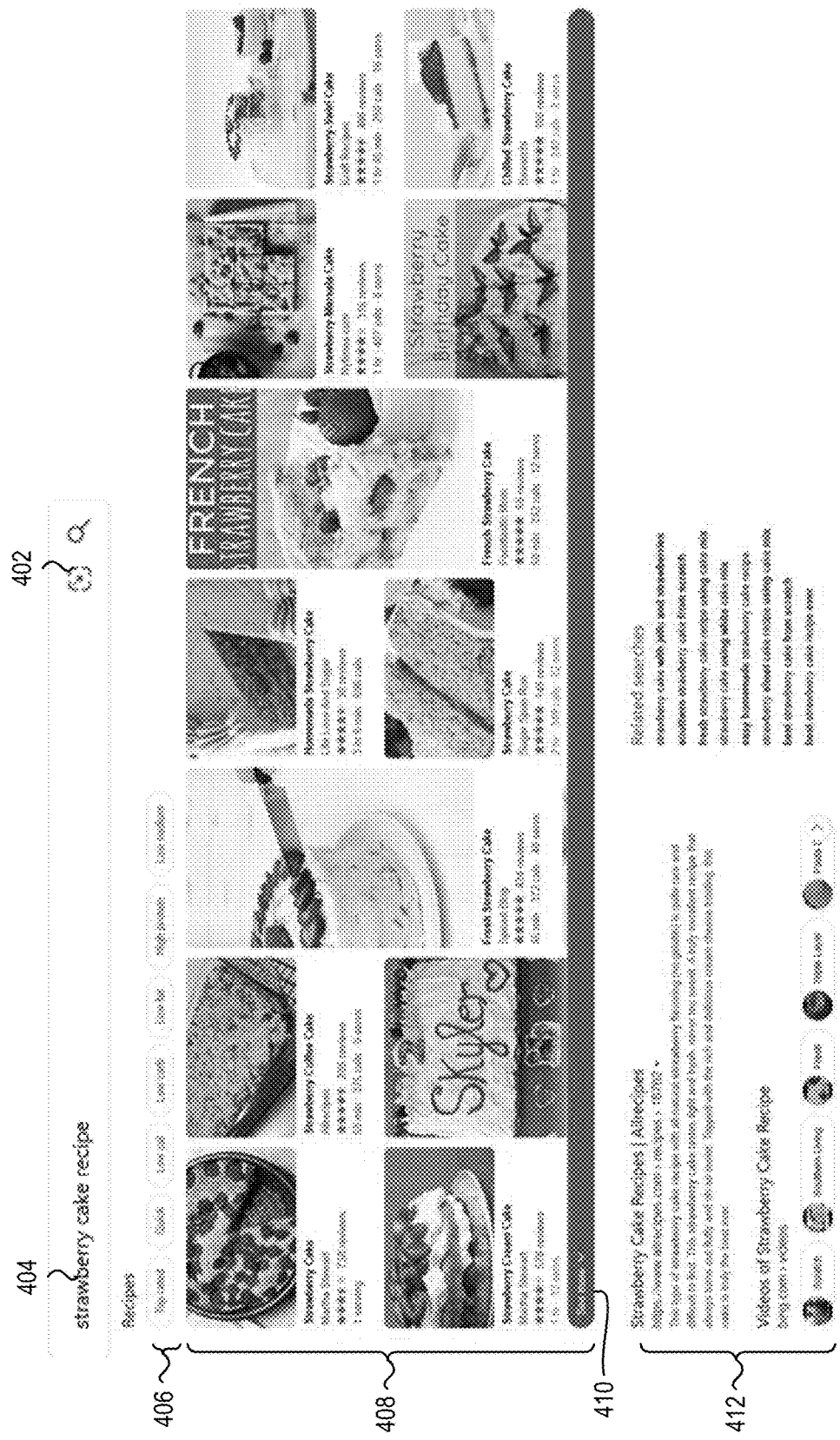
FIG. 4 illustrates an example graphical user interface of a webpage displaying a cascading waterfall layout with a plurality of images for recipes and search results in accordance with some embodiments of the present disclosure.

Referring now to FIG. 3, illustrated is an example graphical user interface 300 displayed in a search result webpage 16 (FIG. 1) on a display 10 (FIG. 1) of a device 102 (FIG. 1). A user may enter in a query 12 (FIG. 1) for "DIY landscaping ideas" on a search webpage. The DIY landscaping ideas may be a multi-step task. The query 12 may include a request for task details for completing the DIY project (DIY landscaping ideas). The cascading waterfall layout 302 may include six columns with four rows of images for the DIY project. The cascading waterfall layout 302 may be presented differently on devices 102 with different display sizes 48 (e.g., a different number of columns and/or rows may be presented).

A user may select an image 310 from the plurality of images in the cascading waterfall layout 302 to explore more. Adjacent to the cascading waterfall layout 302, structured data 304 for the selected image 310 is presented. The structured data 304 includes an image 308 for "10 Simple DIY Landscaping Ideas for Your Home on the Cheap." The image 308 provides additional details and/or an overview of the DIY landscaping project discussed in the webpage for the selected image 310.

Related content 306 to the selected image 308 may also be presented with the structured data 304. The search engine 26 may provide related content 306 based on a combination of the data in the webpage associated with the selected image 310 and/or the selected image 310. For example, the selected image 310 is for "10 Simple DIY Landscaping Ideas for Your Home on the Cheap" and the related content 306 may be other low cost DIY projects for your home. As such, the related content 306 provided in the structured data 304 may be based on the information in the webpage of the selected image 310. Thus, as the user selects different images from the cascading waterfall layout 302, the related content 306 may change based on the different content included in the webpages associated with the newly selected images.

Referring now to FIGS. 4-7, illustrated are examples of graphical user interface 400 displayed in a search result webpage 16 (FIG. 1) on a display 10 (FIG. 1) of a device 102 (FIG. 1). A user may enter in a query 404 for "strawberry cake recipes" in the search box 402. The query 404 may include a request for details for preparing or cooking a strawberry cake.

The presentation component 28 (FIG. 1) may present on the search result webpage 16 a cascading waterfall layout 408 that includes a plurality of images 40 (FIG. 1) from a plurality of webpages 38 (FIG. 1) that include details for strawberry cake recipes returned from a search engine 26 (FIG. 1). The cascading waterfall layout 408 may correspond to the cascading waterfall layout 18 discussed in FIG. 1. The cascading waterfall layout 408 may include seven columns of images. The size of the plurality of images displayed in the cascading waterfall layout 408 may differ between rows and/or columns. The cascading waterfall layout 408 includes two rows for displaying the plurality of images 40 and an icon 410 that may be selected to provide additional images in the cascading waterfall layout 408. The user may use the cascading waterfall layout 408 to visually explore different recipes for strawberry cakes. The cascading waterfall layout 408 may be presented differently on devices 102 with different display sizes 48 (e.g., a different number of columns and/or rows may be presented).

The presentation component 28 may also present on the search result webpage 16 one or more filters options 406 for filtering the cascading waterfall layout 408. The filter options 406 include "top rated," "quick," "low calorie," "low carbohydrates," "low fat," "high protein," and "low sodium." The user may select one or more of the filter options 406 to only have images associated with the selected filter options shown on the cascading waterfall layout 408.

In addition, the presentation component 28 may present on the search result webpage 16 search results 24 provided from the search engine 26 for the query 404 for "strawberry cake recipes." The search results 412 may be from a general search index and are presented below the cascading waterfall layout 408.

Figure 5:
FIG. 5 illustrates an example graphical user interface of a webpage displaying a cascading waterfall layout with a plurality of images for recipes in accordance with some embodiments of the present disclosure.

If the user selects the icon 410 to see additional images, the graphical user interface 400 is updated as illustrated in FIG. 5. Referring now to FIG. 5, the cascading waterfall layout 408 expands to include additional rows of images in response to the user selecting the icon 410. The number of rows increases from two rows to four rows, while the number of columns remain the same at seven. The one or more filter options 406 may remain on the search result webpage 16. However, the additional search results 412 may no longer be visible on the search result webpage 16 without scrolling the search result webpage 16 up and/or down.

Figure 6A:
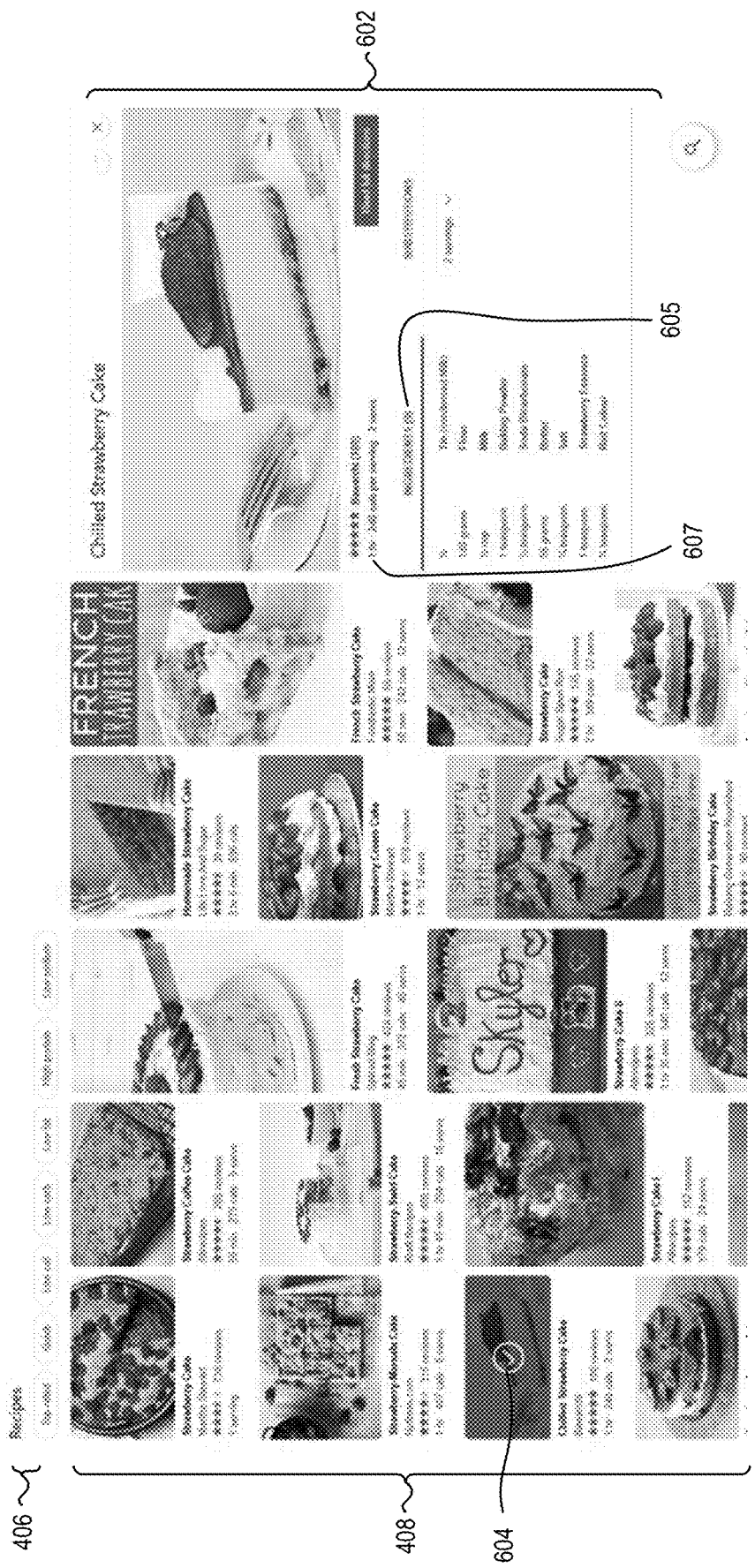
FIGS. 6A and 6B illustrate an example graphical user interface of a webpage displaying a cascading waterfall layout with a plurality of images for recipes and structured data for a selected image in accordance with some embodiments of the present disclosure.

Referring now to FIG. 6A, if a user selects an image 604 from cascading waterfall layout 408, the structured data 602 associated with the webpage for the selected image 604 is presented on the search result webpage 16. The presentation component 28 adjusts the presentation of the cascading waterfall layout 408 to make room for the structured data 602. The presentation component 28 reduces the number of columns from seven to five. In addition, the presentation component 28 rearranges the displayed images to fit within the rows.

The structured data 602 may include the ingredients 605 needed for the strawberry cake recipe discussed in the webpage associated with the selected image 604. The structured data 602 may also include user ratings and a URL link to the webpage. In addition, the structured data 602 may include any ingredient substitutes that may be made to the recipe. The structured data 602 may also include an estimated time 607 required to complete the recipe.

Figure 6B:
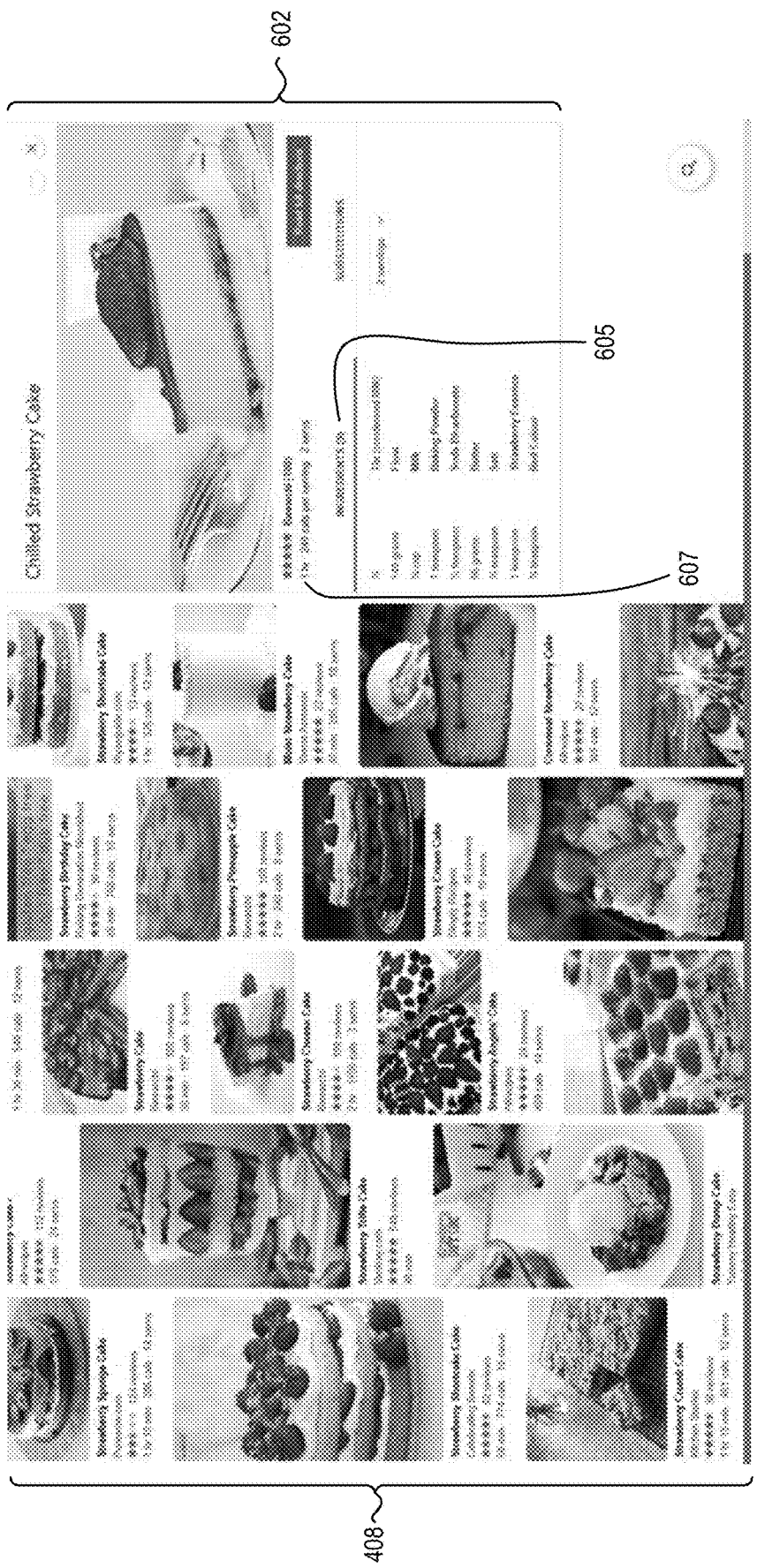

The images previously displayed in the cascading waterfall layout 408 are still visible on the search result webpage 16 by scrolling down on the search result webpage 16, as illustrated in FIG. 6B. Referring now to FIG. 6B, if the user scrolls down to view additional images, a position of the structure data 602 on the display 10 remains constant while the user is scrolling through the rows of the plurality of images in the cascading waterfall layout 408. Moreover, the information provided in the structured data 62 (e.g., the ingredients 605 needed for the strawberry cake recipe, user ratings, a URL link to the webpage, any ingredient substitutes that may be made to the recipe, and/or an estimated time 607 required to complete the recipe) remains the same as the user scrolls through additional rows of the plurality of images in the cascading waterfall layout 408. The one or more filter options 406 (FIG. 6A) may remain on the search result webpage 16.

Figure 7:
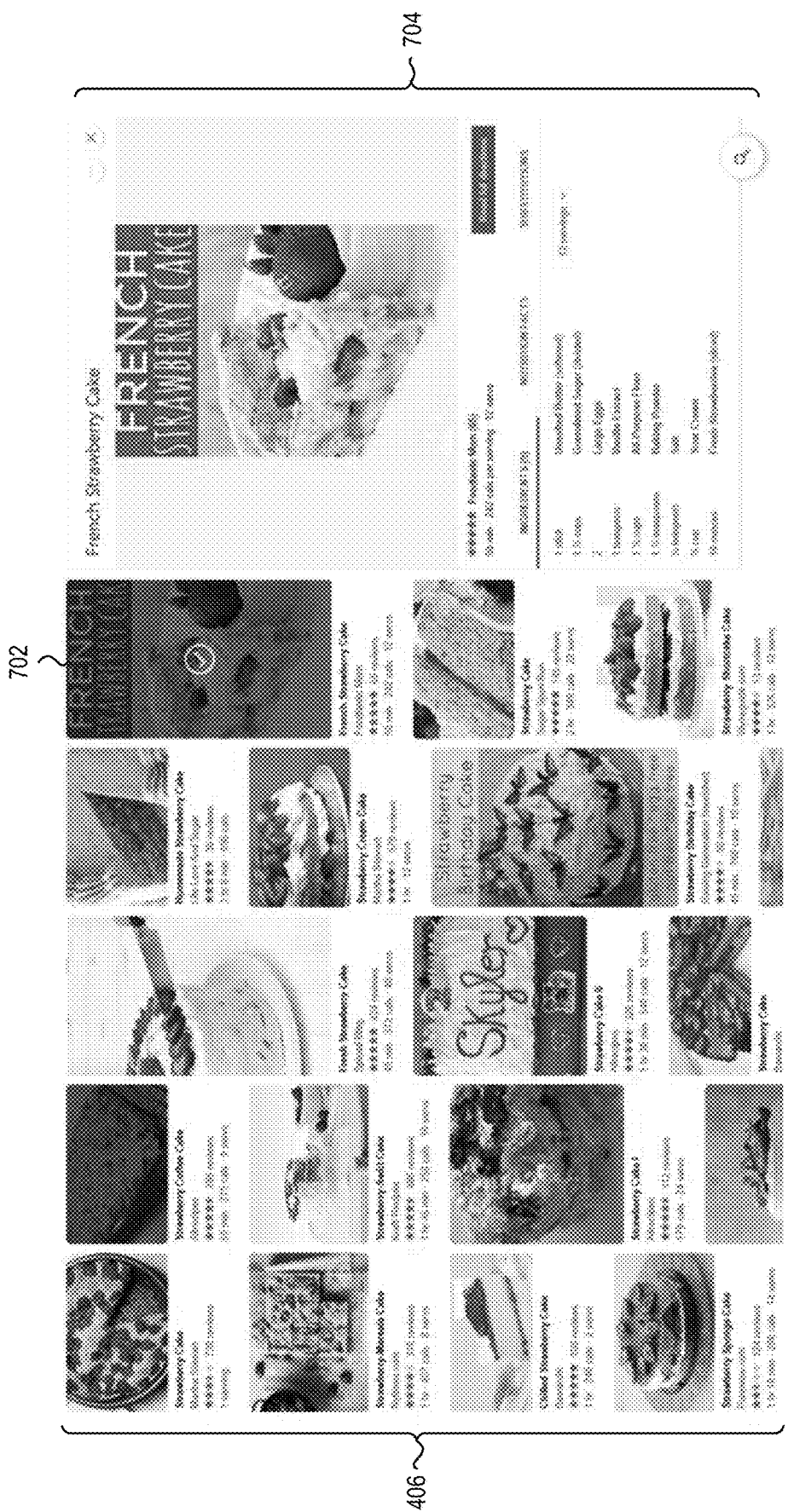
FIG. 7 illustrates an example graphical user interface of a webpage displaying a cascading waterfall layout with a plurality of images for recipes and structured data for another selected image in accordance with some embodiments of the present disclosure.

Referring now to FIG. 7, if a user selects a different image 702 from cascading waterfall layout 408, the structured data 704 associated with the webpage for the selected image 702 is presented on the search result webpage 16. The presentation component 28 may replace the previously presented structured data 602 (FIG. 6A) for the selected image 604 (FIG. 6A) with the structured data 704 for the newly selected image 702. The other images remain displayed in the cascading waterfall layout 408. The display attributes of the selected image 702 may be visually distinct from the remaining images displayed in the cascading waterfall layout 408 (e.g., the selected image 702 is darker relative to the other images). As such, a persistent display of structured data may remain on the search result webpage 16 as the user selects different images presented in the cascading waterfall layout 408.

The structured data 704 may include the ingredients needed for the strawberry cake recipe discussed in the webpage associated with the selected image 702. The structured data 704 may also include user ratings and a URL link to the webpage. In addition, the structured data 704 may include nutrition facts for the recipe and/or any ingredient substitutes that may be made to the recipe.

Figure 8:
FIG. 8 illustrates an example graphical user interface of a webpage displaying a cascading waterfall layout with a plurality of images for recipes and one or more filters in accordance with some embodiments of the present disclosure.

Referring now to FIG. 8, illustrated is an example graphical user interface 800 displayed in a search result webpage 16 (FIG. 1) on a display 10 (FIG. 1) of a device 102 (FIG. 1). A user may enter in a query 812 for "dinner recipes." The query 812 may include a request for suggestions and/or recommendations for dinner recipes.

The presentation component 28 (FIG. 1) may provide a cascading waterfall layout 806 to present on a search result webpage 16 (FIG. 1) that includes a plurality of images 40 (FIG. 1) from a plurality of webpages 38 (FIG. 1) returned from a search engine 26 (FIG. 1) with information for different dinner recipes. The cascading waterfall layout 806 includes five columns with two rows of images in the illustrated example. The cascading waterfall layout 806 may be presented differently on devices 102 with different display sizes 48 (e.g., a different number of columns and/or rows may be presented).

The presentation component 28 may also present on the search result webpage 16 one or more filters options 810 for filtering the cascading waterfall layout 806. The filter options 810 include "quick," "easy," "healthy," "time," "dietary restrictions," "allergies," "nutrition," "techniques," and "cuisine." The user may select one or more of the filter options 810 to only have images associated with the selected filter options shown on the cascading waterfall layout 806.

The one or more filter options 810 may include a drop down that allows further selection by the user. If the user selects the filter option allergies 802, a drop down menu 804 may be presented with different selections the user may pick for allergies. For example, if the user selects gluten-free, the cascading waterfall layout 806 may be filtered to only show images of recipes that are gluten-free. The query classifier 29 may have performed one or more machine learning searches on the webpages associated with images to determine whether the recipes are gluten-free. The machine learning searches may evaluate the ingredients to determine if any of the ingredients have gluten and/or the text of the webpage to determine whether the recipe is gluten free. For example, if a recipe has flour, the query classifier 29 determines that that recipe has gluten. However, if the recipe uses "rice flour," the query classifier 29 may determine that the recipe is gluten-free. Another example may include the webpage including text that says, "easy gluten-free recipes." The query classifier 29 may use the text in determining that the recipe is gluten-free.

Figure 9:
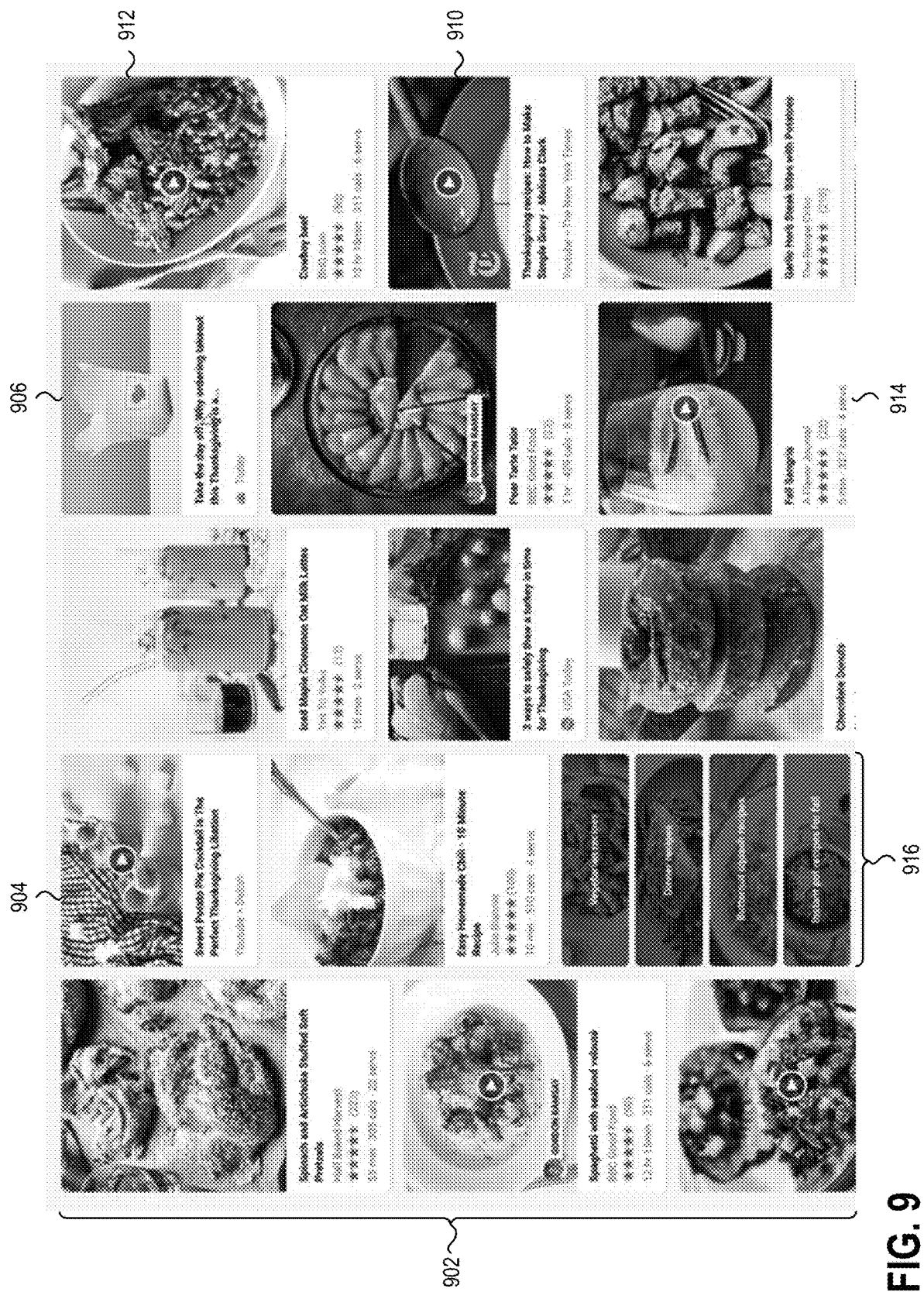
FIG. 9 illustrates an example graphical user interface of a webpage displaying a cascading waterfall layout with a plurality of images and videos for recipes in accordance with some embodiments of the present disclosure.

Referring now to FIG. 9, illustrated is an example graphical user interface 900 displayed in a search result webpage 16 (FIG. 1) on a display 10 (FIG. 1) of a device 102 (FIG. 1). For example, a user may enter in a general query 12 for cooking and the graphical user interface 900 may include a cascading waterfall layout 902 with a plurality of images 40 (FIG. 1) from a plurality of webpages 38 (FIG. 1) associated with a tasks 14 for cooking. The cascading waterfall layout 902 may be presented differently on devices 102 with different display sizes 48 (e.g., a different number of columns and/or rows may be presented). The cascading waterfall layout 902 may also include a plurality of videos 904, 910, 912, 918 relating to cooking. The videos 904, 910, 912, 918 optionally have visually distinct display attributes from the display attributes of the plurality of images to indicate to a user that a video is displayed instead of an image. For example, the videos may include an overlay (e.g., with a play button), a distinctive border, or text highlighting.

The cascading waterfall layout 902 may also include a news article 906 on cooking. In addition, the cascading waterfall layout 902 may also include one or more recommendations 916 for recipes for different cooking categories (e.g., vegetarian recipes, dinner recipes, butternut squash recipes, and/or Instant pot recipes for fall). The recommendations 916 may be based on the original query or based on the content discussed in the plurality of webpages 38 included in the cascading waterfall layout 902. The recommendations 916 may include similar content to the content expressed in the plurality of images 40 and/or the content expressed in the plurality of webpages 38. The recommendations 916 may have visually distinct display attributes (e.g., different backgrounds, different boarders) from the display attributes of the plurality of images to indicate to a user that one or more recommendations 916 are provided instead of an image.

Figure 10:
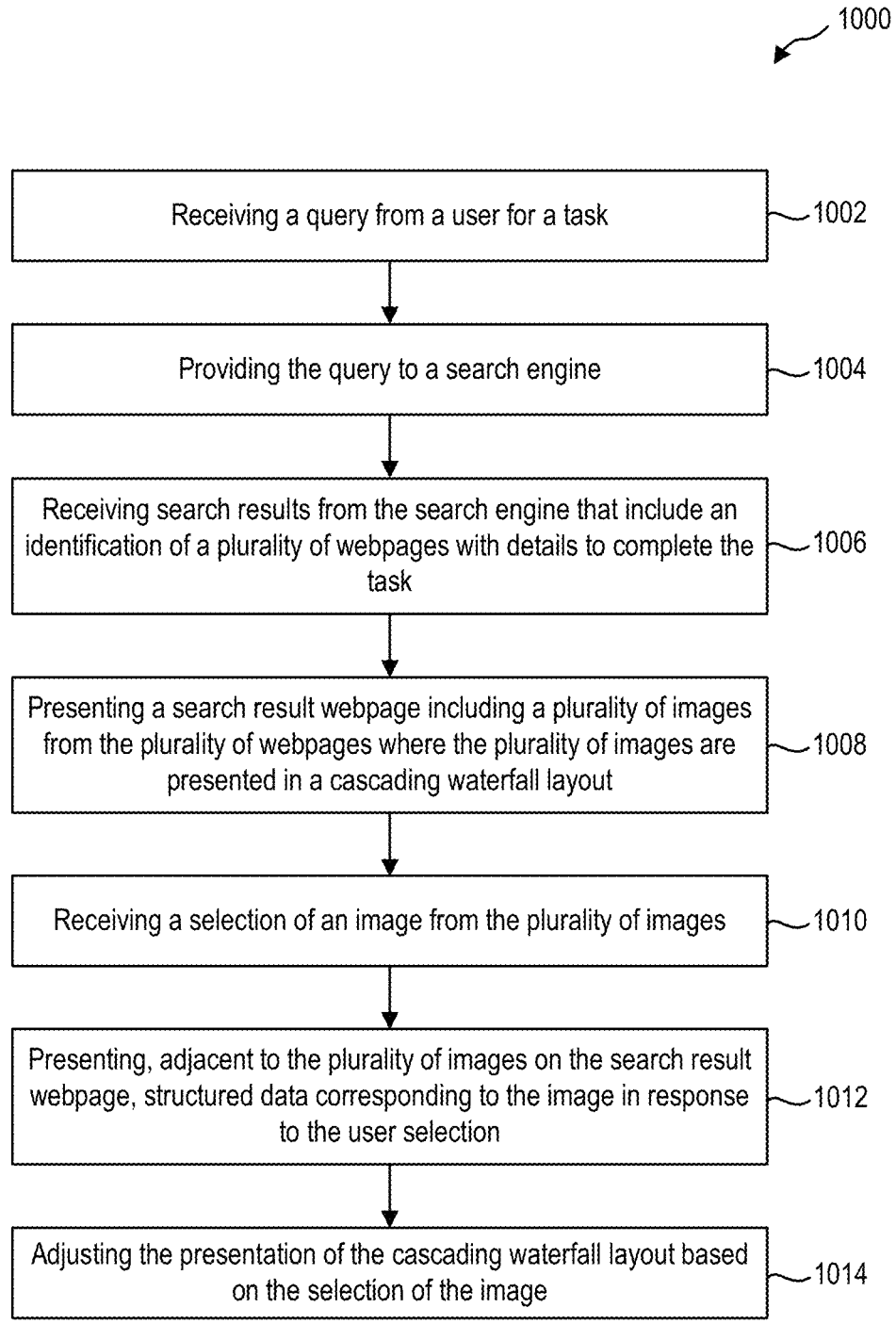
FIG. 10 illustrates an example method for presenting structured data with search engine results in accordance with some embodiments of the present disclosure.

Referring now to FIG. 10, illustrated is an example method 1000 performed by device 102 (FIG. 1) for presenting structured data 22 (FIG. 1) with search engine results 24 (FIG. 1) on a display 10 (FIG. 1) of a device 102 (FIG. 1). The actions of method 1000 may be discussed below with reference to the architecture of FIG. 1.

At 1002, method 1000 may include receiving a query from a user for a task. The device 102 may receive a query 12 from a user of device 102. The user may enter queries 12 for searching different webpages for a task 14 and/or performing a visual exploration of one or more tasks 14. The query 12 may identify a multi-step task 14. In addition, the query 12 may include a request for task details for completing the task. For example, the user may enter in the query 12 on a search engine webpage.

At 1004, method 1000 may include providing the query to a search engine. The device 102 may provide the query 12 to one or more search engines 26 in communication with the device 102. The search engine 26 may search one or more datastores 108, 110 with a plurality of webpages 31, 33 in response to the received query 12. The search engine 26 may generate search results 24 that identify a plurality of webpages 30 from the datastores 108, 110 that discuss the task 14, include details to complete the task 14, and/or may be relevant to the task 14. The search engine 26 may also generate textual search results 24 with a plurality of search results for the query 12. The webpages 30 included in the search results 24 may include a plurality of images 32, a plurality of videos, and/or a plurality of text 36.

A query classifier 29 may perform further processing on the search results 24 to determine which images 32 and/or which webpages 30 from the search results 24 to present for the task 14 in response to the query 12. The query classifier 29 may be a trained machine learning model that analyzes the search results 24 and the query 12 to determine which webpages 30 and/or images 32 of the search results 24 to present for the task 14. The segment or domain (e.g., recipes, DIY, travel plans) of the task 14 may be predicted by another query classifier trained on human labeled data. The query classifier 29 may be trained based on fully supervised data (labeled by humans) or weakly supervised data for more than one segments and/or domains. Different query classifiers 29 may be selected for analyzing the search results 24 based on the segment or domain of the task 14.

The query classifier 29 may determine which images, videos, and/or gifs to include in the cascading waterfall by using a ranking 42 based on a weighted combination of aspects. For example, the image relevance to the task, image attractiveness, and/or page usefulness may go into the ranking. The results of the ranking 42 may be deduplicated based on image content. For exploratory queries, higher rankings 42 may be assigned to page related aspects and idea-based deduplication may be applied. For example, if there are multiple images for the same idea of garage decoration (e.g., just photographed from different angles), only one image per idea may be shown or the ideas may be grouped and shown with multiple images with the same context information.

The query classifier 29 may identify a plurality of images 40 to present and/or a plurality of webpages 38 to present from the search results 24. As such, a subset of the images 32 and/or the webpages 30 provided in the search results 24 may be selected for presentation in response to the query 12.

At 1006, method 1000 may include receiving search results from the search engine that include an identification of a plurality of webpages with details to complete the task. The search engine 26 may send the search results 24 to the device 102 for presentation on the display 10. The search results 24 may be based on the general search index for the task 14. The search engine 26 may also send to the device 102 the identified plurality of webpages 38 that include details and/or information for completing the task 14. The information included in the search results 24 may be different from the information included in the identified plurality of webpages 38.

At 1008, method 1000 may include presenting a search result webpage including at plurality of images from the plurality of webpages where the plurality of images are presented in a cascading waterfall layout. The device 102 may have a presentation component 28 that determines a presentation on the search result webpage 16 of the received search results 24, the plurality of webpages 38 and/or associated plurality of images 40, and/or any received structured data 22 for the plurality of webpages 38. The presentation component 28 may generate a cascading waterfall layout 18 to present the plurality of images 40 for the identified plurality of webpages 38. The plurality of images 40 may include, for example, images, gifs, and/or videos.

The presentation component 28 may determine to trigger the presentation of the cascading waterfall layout 18 based on the query 12 provided by the user. The presentation component 28 may use a trained machine learning model to determine an image intent in a query 12 and select whether the present the cascading waterfall layout 18 based on the image intent of the query 12. As such, the presentation component 28 may use the trained machine learning model to determine that the query 12 is a visual exploration search and may trigger the presentation of the cascading waterfall layout 18.

The cascading waterfall layout 18 may include a plurality of columns 50 for presenting the plurality of images 40 from the plurality of webpages 38. The width of the plurality of columns 50 may be based on the image result sizes and/or the display size 48 of the device 102 The width of the plurality of columns 50 may be fixed and the number of columns included in the plurality of columns 50 may be based on the display size 48 of the device 102. The number of rows displayed in the cascading waterfall layout 18 may be selected based on the display size 48 and/or the size of the images. The presentation component 28 may place the plurality of images 40 into the plurality of columns 50 using the rankings 42 and/or the presentation component 28 may use information about the presentation of the plurality of images 40 in the original webpages 30 in determining the order for presenting the plurality of images 40.

The presentation component 28 may start with a first image from the plurality of images 40 and place the image into a first column of the plurality of columns 50. A next image from the plurality of images 40 is placed into a second column of the plurality of columns 50. The image placement continues until one image is placed per column. The images may have different sizes and the images per column may differ in size. The presentation component 28 may calculate which column has a least number of pixels from the top of the search result webpage 16 and places a next image from the plurality of images 40 into the identified column. The presentation component 28 may continue to calculate which column has a least number of pixels from the top of the search result webpage 16 and place a next image into the identified column until a predetermined number of images are presented in the cascading waterfall layout 18. The predetermined number of images may present an initial subset of the plurality of images 40 to include in the cascading waterfall layout 18. As such, the presentation component 28 may fill up the cascading waterfall layout 18 with images based on a combination of the rankings of the images 40 and the display requirements of the device 102. The plurality of images 40 initially presented in the cascading waterfall layout 18 may be the images with a highest ranking 42.

At 1010, method 1000 may include receiving a selection of an image from the plurality of images. A user may select one image of the plurality of images 40 presented in the cascading waterfall layout 18. For example, the user may want to review the image further or obtain additional information for the selected image. The display attributes of the selected image may be visually distinct from the remaining images displayed in the cascading waterfall layout 18 (e.g., the selected image is darker relative to the other images) to indicate which image is selected by the user.

At 1012, method 1000 may include presenting, adjacent to the plurality of images on the search result webpage, structured data corresponding to the image in response to the user selection. The presentation component 28 may present the structured data 22 associated with the webpage for the selected image. The structured data 22 may include, but is not limited to, recipes, prices, user ratings, reviews, a uniform resource locator (URL) link to the webpage, the webpage name steps for performing the task 14, step-by-step images for performing the task 14, an instructional video for performing the task 14, a list of materials needed for performing the task 14, an estimated time required to complete the task 14, direct links to a portion of the webpage where the task 14 is described, an aggregate of information from different webpages for the task 14 (additional images, steps, materials description, etc.), substitute materials for the task 14, and/or local information 44 associated with the task 14.

The structured data 22 may be presented adjacent to the cascading waterfall layout 18. In some embodiments, the presentation component 28 may present the structured data using a rich card 20. By presenting the structured data 22 next to the cascading waterfall layout 18 on the same search result webpage 16, users may make more informed decisions about whether to go to the source webpage for the selected image.

One example use case may include a query 12 for a DIY project for building a bird house. The cascading waterfall layout 18 may include a plurality of images 40 for different DIY bird house building projects. A user may select one of the images and the structured data 22 for the webpage discussing the bird house DIY project shown in the image. The structured data 22 is presented on the side of the images in the cascading waterfall layout 18. The structured data 22 may include a materials list for the bird house DIY project. In addition, the structured data 22 may include step-by-step images for performing the bird house DIY project and an estimated time to complete the bird house DIY project.

The structured data 22 may also include local information 44 provided from sources other than the webpage associated with the selected image. The local information 44 may include a local cost of materials for the bird house DIY project, local availability of the materials, and a store located nearby the device 102 where the user may purchase the materials. As such, the user may use the local information 44 to determine the cost of the bird house DIY project and where to purchase the materials locally.

One or more recommendations 49 and/or advertisements may be presented with the structured data 22 based on the selected image. The recommendations 49 may include similar content to the content expressed in the selected image and/or the content expressed in the associated webpage. The recommendations 49 may include tools needed for the project. Even if the webpage does not mention tools needed to complete the project, the tools recommended may be based on tools needed for similar projects. If the materials cost $25, the recommendations 49 may include other DIY projects for $25. If the user selects a different image of a bird house DIY project where the materials cost $100, the recommendations 49 may include other DIY projects for $100. As such, the DIY projects included in the recommendations 49 may change based on the selected images and the information associated with the webpage for the image without modifying the plurality of images 40 included in the cascading waterfall layout 18.

Another example use case may include a query 12 for healthy lasagna recipes. The cascading waterfall layout 18 may include a plurality of images 40 for associated source webpages that discuss different healthy recipes for lasagna. A user may select one of the images and the structured data 22 for the selected image may be presented next to the cascading waterfall layout 18. The structured data 22 may include a listing of ingredients for the recipe from the associated webpage. In addition, the structured data 22 may include a direct link to a portion of the webpage where the recipe is located. For example, if the user selects the direct link, the webpage may open directly to the portion of the webpage where the recipe is included. As such, the user may save a few seconds from having to scroll through the webpage to locate the start of the recipe. The structured data 22 may also include an instruction section that provides the users a few sentences for how to make the recipe.

The structured data 22 may also include local information 44 provided from sources other than the webpage associated with the selected image. The local information 44 may include a local cost of ingredients for the recipe, local availability of the ingredients, and a store located nearby the device 102 where the user may purchase the ingredients. As such, the user may use the local information 44 to determine cost of the ingredients for the recipe and where to purchase the ingredients locally.

One or more recommendations 49 may be presented with the structured data 22 based on the selected image. The recommendations 49 may include similar content to the content expressed in the selected image and/or the content expressed in the associated webpage. For example, other recipes may be presented with the structured data 22 based on the selected image. If the selected image is for lasagna soup, the recommendations 49 may include other healthy soup recipes. If the selected image is for chocolate lasagna, the recommendations 49 may include other healthy dessert recipes. If the selected image is for lasagna, the recommendations 49 may include other pasta ideas. The recommendations 49 may include images of the recommended recipes. The recommendations 49 may not be included in the cascading waterfall layout 18 but may be obtained in response to a new query constructed based on the selected image. As such, the recipes included in the recommendations 49 may change based on the selected images without modifying the plurality of images 40 included in the cascading waterfall layout 18.

Another example use case may include a query 12 for a trip to Paris, France. The cascading waterfall layout 18 may include a plurality of images 40 for associated source webpages that discuss travelling to Paris. A user may select one of the images and the structured data 22 associated with the selected image may be presented adjacent to the cascading waterfall layout 18. The structured data 22 may include an aggregation of information from multiple webpages. For example, the structured data 22 may include user reviews from a plurality of webpages of the top ten restaurants in Paris. Another example may include the structure data 22 may include the top twenty attractions in Paris with highlights from each attraction provided.

At 1014, method 1000 may include adjusting the presentation of the cascading waterfall layout based on the selection of the image. The presentation component 28 adjusts the presentation of the cascading waterfall layout 18 based on the selection of the image so that the structured data 22 is presented next to the cascading waterfall layout 18. Adjusting the presentation of the cascading waterfall layout 18 may include, for example, resizing a column of the plurality of columns 50, reducing a number of columns of the plurality of columns 50, rearranging an ordering of the images within at least one column of the plurality of columns 50, resizing the images within the plurality of columns 50, and/or rearranging a position of the images within the plurality of columns 50. As such, the cascading waterfall layout 18 has an adaptive arrangement of columns based on available screen real estate and responsive design.

The presentation component 28 adjusts the presentation of the cascading waterfall layout 18 without issuing a new search request to the search engine 26 and/or changing the query 12 from the user. If a user selects a different image from the plurality of images 40, the presentation component 28 may replace the structured data 22 presented with the structured data 22 for the webpage associated with the different image. The position of the structured data 22 on the display 10 remains constant while the user is scrolling through rows of the plurality of images in the cascading waterfall layout 18 and/or selecting different images to view.

The user may view different structure data 22 for different images selected from the plurality of images 40 without issuing a new search to the search engine 26 or changing the query 12 from the user, resulting in an improvement of the search result webpage 16 by not having to refresh the entire search result webpage 16 each time a new image is selected. As such, the user may easily switch between the structured data 22 for different images selected resulting in quick and easy comparison of the different tasks 14 for the selected images. Moreover, the user may quickly browse more ideas by reviewing the structured data 22 for different images selected without having to redirect to the webpages associated with the selected images.

The search result webpage 16 may include one or more filter options 54 for filtering the cascading waterfall layout 18 based on the structured data 22 associated with each image of the plurality of images 40. Filters 54 may include, but are not limited to, cost, time, materials, categories, and/or ingredients. The presentation component 28 may adjust the presentation of the cascading waterfall layout 18 based on the one or more filters 54 selected. For example, the presentation component 28 may remove one or more images from the plurality of images 40 based on the selected filters 54. As such, the presentation may dynamically filter the images 40 included in the cascading waterfall layout 18 based on the selected filters 54.

The search result webpage 16 may present the cascading waterfall layout 18 and the search results 24. In some embodiments, the search results 24 are presented below the cascading waterfall layout 18. As such, the cascading waterfall layout 18 is presented in a top portion of the search result webpage 16 and the search results 24 are presented in a lower portion of the search result webpage 16.

Another example method performed by a server 106 (FIG. 1) may include generating and returning search results 24 (FIG. 1) for a query 12 (FIG. 1) to a device 102 (FIG. 1). The actions of method may be discussed below with reference to the architecture of FIG. 1. The method may include receiving a query 12 for a task 14. The search engine 26 may receive one or more queries 12 for a task 14 from one or more devices 102.

The method may include generating a task index for the query and querying one or more datastores for webpages with information related to the task. The search engine 26 may generate a task index for the query 12 and may query one or more datastores 108, 110 with webpages 31, 33. The search engine 26 may generate search results 24 with an identification of a plurality of webpages, wherein each webpage of the plurality of webpages includes details to complete the task 14.

The method may include supplementing the search results with third party data for the task. For example, the search engine 26 may supplement the search results 24 with local information 44 provided by a third party datastore 112. The local information 44 may include, but is not limited to, details about the price and/or availability of materials for the task 14 based on the location of the device 102.

The method may include returning the search results and the third party data for the task to the device. The search engine 26 may send the search results 24 and the local information 44 to the device 102 in response to receiving the query 12.

As illustrated in the foregoing discussion, the present disclosure utilizes a variety of terms to describe features and advantages of the query classifier, the search engine, and/or the presentation component. Additional detail is now provided regarding the meaning of such terms. For example, as used herein, a "machine learning model" refers to a computer algorithm or model (e.g., a classification model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

INDUSTRIAL APPLICABILITY

The present disclosure relates to systems, devices, and methods for presenting structured data with search engine results on a display of a device. This disclosure provides better context for comparing ideas (recipes, travel destinations, DIY projects, etc.) by showing not only images, gifs, and/or videos for search results for a task, but also relevant page information using structured data extracted from the webpage associated with the images. The structured data may include, but is not limited to, title of the webpage, recipes, prices, user ratings, reviews, a uniform resource locator (URL) link to the webpage, the webpage name steps for performing the task 14, step-by-step images for performing the task 14, an instructional video for performing the task 14, a list of materials needed for performing the task 14, an estimated time required to complete the task 14, direct links to a portion of the webpage where the task 14 is described, an aggregate of information from different webpages for the task 14 (additional images, steps, materials description, etc.), substitute materials for the task 14, local information 44 associated with the task 14, and/or rich metadata extracted from the webpages.

The presentation provided by the methods and devices may include a cascading waterfall layout with a plurality of images. The size of the cascading waterfall layout (e.g., the number of columns and/or the number of rows included) is based on the display size and/or the sizes of the images. The plurality of images may be associated with a plurality of webpages that include details for completing the task. The plurality of webpages may be included in search results returned by a search engine in response to a query for the task. The cascading waterfall layout is concise enough to allow quick comparison and exploration of the ideas. The cascading waterfall layout may be presented at a top portion of a search result webpage above the general search results returned by the search engine for a query.

A determination is made to trigger the cascading waterfall layout of images, videos, and/or gifs based on the query provided by the user. A trained machine learning model may be used to determine whether to trigger the presentation of the cascading waterfall layout. The machine learning model may be trained based on fully supervised data (labeled by humans) or by weakly supervised data of search engine logs to extract images searches where users are interested in the source pages, not only in the images, based on whether the user clicks on pages more often than the image from the search engine logs. The user clicking on the source pages may indicate that the query has visual exploration intent (exploration because of clicking on the webpages may indicate interest in additional context and/or related information) and visual intent because the query was issued to an image search, not a web search. If the machine learning model determines that the query includes a visual intent, the presentation of the cascading waterfall layout of images may be triggered.

A determination of which images, videos, and/or gifs to include in the cascading waterfall may be made by using a ranking based on a weighted combination of aspects. For example, the image relevance to the task, image attractiveness, and/or page usefulness may go into the ranking. The results of the ranking may be deduplicated based on image content. For exploratory queries, higher weights may be assigned to page related aspects and idea-based deduplication may be applied. For example, if there are multiple images for the same idea of garage decoration (e.g., just photographed from different angles), only one image per idea may be shown or the ideas may be grouped and shown with multiple images with the same context information. The order of images presented in the cascading waterfall may be also specific (e.g., for DIY projects the order of images presented may be a logical order of steps to complete the project). The methods and devices may also integrate a visual search where users search by images (e.g., exploring ideas with similar look, such as, bedrooms in similar styles, colors) in determining which images to include in the cascading waterfall layout.

One example use case may include a query for a DIY project for building a bird house. The cascading waterfall layout may include a plurality of images for different DIY bird house building projects. A user may select one of the images and the structured data for the webpage discussing the bird house DIY project shown in the image. The structured data is presented on the side of the images in the cascading waterfall layout. The structured data may include a materials list for the bird house DIY project. In addition, the structured data may include step-by-step images for performing the bird house DIY project and an estimated time to complete the bird house DIY project.

The structured data may also include local information provided from sources other than the webpage associated with the selected image. The local information may include a local cost of materials for the bird house DIY project, local availability of the materials, and a store located nearby the device where the user may purchase the materials. As such, the user may use the local information to determine the cost of the bird house DIY project and where to purchase the materials locally.

One or more recommendations may be presented with the structured data based on the selected image. The recommendations may include similar content to the content expressed in the selected image and/or the content expressed in the associated webpage. The recommendations may include tools needed for the project. Even if the webpage does not mention tools needed to complete the project, the tools recommended may be based on tools needed for similar projects. If the materials cost $25, the recommendations may include other DIY projects for $25. If the user selects a different image of a bird house DIY project where the materials cost $100, the recommendations may include other DIY projects for $100. As such, the DIY projects included in the recommendations may change based on the selected images and the information associated with the webpage for the image without modifying the plurality of images included in the cascading waterfall layout.

Another example use case may include a query for healthy lasagna recipes. The cascading waterfall layout may include a plurality of images for associated source webpages that discuss different healthy recipes for lasagna. A user may select one of the images and the structured data for the selected image may be presented next to the cascading waterfall layout. The structured data may include a listing of ingredients for the recipe from the associated webpage. In addition, the structured data may include a direct link to a portion of the webpage where the recipe is located. For example, if the user selects the direct link, the webpage may open directly to the portion of the webpage where the recipe is included. As such, the user may save a few seconds from having to scroll through the webpage to locate the start of the recipe. The structured data may also include an instruction section that provides the users a few sentences for how to make the recipe.

The structured data may also include local information provided from sources other than the webpage associated with the selected image. The local information may include a local cost of ingredients for the recipe, local availability of the ingredients, and a store located nearby the device where the user may purchase the ingredients. As such, the user may use the local information to determine cost of the ingredients for the recipe and where to purchase the ingredients locally.

One or more recommendations may be presented with the structured data based on the selected image. The recommendations may include similar content to the content expressed in the selected image and/or the content expressed in the associated webpage. For example, other recipes may be presented with the structured data based on the selected image. If the selected image is for lasagna soup, the recommendations may include other healthy soup recipes. If the selected image is for chocolate lasagna, the recommendations may include other healthy dessert recipes. If the selected image is for lasagna, the recommendations may include other pasta ideas. The recommendations may include images of the recommended recipes. The recommendations may not be included in the cascading waterfall layout but may be obtained in response to a new query constructed based on the selected image. As such, the recipes included in the recommendations may change based on the selected images without modifying the plurality of images included in the cascading waterfall layout.

Another example use case may include a query for a trip to Paris, France. The cascading waterfall layout may include a plurality of images for associated source webpages that discuss travelling to Paris. A user may select one of the images and the structured data associated with the selected image may be presented adjacent to the cascading waterfall layout. The structured data may include an aggregation of information from multiple webpages. For example, the structured data may include user reviews from a plurality of webpages of the top ten restaurants in Paris. Another example may include the structure data may include the top twenty attractions in Paris with highlights from each attraction provided.

Technical advantages of the systems, devices, and methods include the user may view different structure data for different images selected from the plurality of images within the cascading waterfall layout without issuing a new search to the search engine or changing the query from the user, resulting in an improvement of the search result webpage by not having to refresh the entire search result webpage each time a new image is selected. As such, the user may easily switch between the structured data for different images selected resulting in quick and easy comparison of the different tasks for the selected images. Moreover, the user may quickly browse more ideas by reviewing the structured data for different images selected without having to redirect to the webpages associated with the selected images.

(A1) In one aspect, some embodiments include a method (1000) for presenting structured data with search engine results on a display of a device. The method includes receiving (1002) a query from a user (e.g., query 204), where the query identifies a multi-step task (e.g., task 14) and comprises a request for task details for completing the task. The method also includes providing (1004) the query to a search engine (e.g., search engine 26). The method further includes, responsive to providing the query, receiving (1006) results from the search engine, where the received results include identification of a plurality of webpages (e.g., webpages 38), where each webpage of the plurality of webpages includes details to complete the task. The method includes presenting (1008) on the display a search result webpage responsive to receiving the results (e.g., search result webpage 16), the search result webpage including a plurality of images (e.g., images 40) from the plurality of webpages, where the plurality of images are presented in a cascading waterfall layout that includes a plurality of columns (e.g., layout 208). The method further includes receiving (1010) a user selection of an image from the plurality of images; and, responsive to the user selection: presenting (1012), adjacent to the plurality of images on the search result webpage, structured data corresponding to the image (e.g., structured data 210), the structured data comprising details from the webpage to complete the task; and adjusting (1014) the presentation of the cascading waterfall layout based on the selection of the image, where the adjusting includes at least one of: resizing a column of the plurality of columns, and rearranging an ordering of images within at least one column of the plurality of columns.

(A2) In some embodiments of the method of A1, adjusting the presentation of the cascading waterfall layout occurs without issuing a new search request to the search engine or changing the query from the user. For example, the structured data associated with each image in the plurality of images is provided to the user device with the search result webpage and is displayed or hidden locally in response to user image selections. In this way the user may explore the images and structured data without sending additional search queries to the search engine.

(A3) In some embodiments of the method of A1 or A2, a number of columns selected for the cascading waterfall layout is based on a size of the display, and adjusting the presentation of the cascading waterfall layout further includes reducing the number of columns displayed and rearranging a position of the plurality of images to fit within the reduced number of columns (e.g., as illustrated in FIGS. 5 & 6).

(A4) In some embodiments of the method of any of A1-A3, displaying the plurality of images further comprises: placing one image of the plurality of images into each column of the plurality of columns; determining which column has a least number of pixels from a top of the search result webpage; placing a next image of the plurality of images into the column with the least number of pixels; and continuing to determine which column has the least number of pixels from the top of the search result webpage and placing another image of the plurality of images into the column with the least number of pixels until a predetermined number of images are displayed in the cascading waterfall layout. For example, in this way the image results located closest to the top of the waterfall are the highest ranked and the image results located lower on the waterfall are lower ranked.

(A5) In some embodiments of the method of any of A1-A4, the structured data is presented at a position on the display, and the position of the structured data on the display remains constant while a user is scrolling through rows of the plurality of images in the cascading waterfall layout (e.g., as illustrated in FIG. 6B).

(A6) In some embodiments of the method of any of A1-A5, the cascading waterfall layout is displayed at a top portion of the search result webpage and textual search results for the query (e.g., results 412) are presented below the cascading waterfall layout.

(A7) In some embodiments of the method of any of A1-A6, at least one webpage of the plurality of webpages includes a video describing task details (e.g., video 904); and the cascading waterfall layout includes the plurality of images and the video, where at least one display attribute of the video is visually distinct from display attributes of the plurality of images.

(A8) In some embodiments of the method of any of A1-A7, the structure data includes one or more of the following from the webpage: steps for performing the task, step-by-step images for performing the task (e.g., images 216), a list of materials needed for performing the task (e.g., ingredients 605), an estimated time required to complete the task (e.g., time 607).

(A9) In some embodiments of the method of any of A1-A8, the structured data includes one or more of the following from sources other than the webpage: estimated cost of materials for the task, local availability of materials for the task, substitute materials for the task, or an aggregation of information from different webpages for the task. For example, the local availability of materials and/or estimated cost may come from a local information database (e.g., local information 44 in datastore 112). As another example, the substitute materials may come from a third party materials datastore.

(A10) In some embodiments of the method of any of A1-A9, the search results webpage includes filter options (e.g., filters 54) for filtering the cascading waterfall based on the structured data associated with each image.

In another aspect, some embodiments include a device (102) having one or more processors; memory in electronic communication with the one or more processors; and instructions stored in the memory, the instructions being executable by the one or more processors to perform any of the methods described herein (e.g., methods A1-A10).

In another aspect, some embodiments include a computer-readable medium storing instructions executable by a computer device (102). The computer-readable medium may include at least one instruction for causing the computer device (102) to perform any of the methods described herein (e.g., methods A1-A10).

What is claimed is:
1. A method for presenting structured data with search engine results on a display of a device, comprising:
    receiving a query from a user, wherein the query identifies a multi-step task and comprises a request for task details for completing the task;
    providing the query to a search engine;
    responsive to providing the query, receiving results from the search engine, wherein the received results include identification of a plurality of webpages, wherein each webpage of the plurality of webpages includes details to complete the task;
    presenting on the display a search result webpage responsive to receiving the results, the search result webpage including a plurality of images from the plurality of webpages, wherein the plurality of images are presented in a cascading waterfall layout that includes a plurality of columns by placing one image of the plurality of images into each column of the plurality of columns and continuing to place images into each column based on an available number of pixels in a column until a predetermined number of images are displayed in the cascading waterfall layout;
    receiving a user selection of an image from the plurality of images; and
    responsive to the user selection:
        presenting, adjacent to the plurality of images on the search result webpage, structured data corresponding to the image, the structured data comprising details from the webpage to complete the task; and
        adjusting the presentation of the cascading waterfall layout based on the selection of the image, wherein the adjusting includes at least one of: resizing a column of the plurality of columns, and rearranging an ordering of images within at least one column of the plurality of columns.

2. The method of claim 1, wherein adjusting the presentation of the cascading waterfall layout occurs without issuing a new search request to the search engine or changing the query from the user.

3. The method of claim 1, wherein a number of columns selected for the cascading waterfall layout is based on a size of the display; and
    wherein adjusting the presentation of the cascading waterfall layout further includes reducing the number of columns displayed and rearranging a position of the plurality of images to fit within the reduced number of columns.

4. The method of claim 1, wherein displaying the plurality of images further comprises:

determining which column has a least number of pixels from a top of the search result webpage;

placing a next image of the plurality of images into the column with the least number of pixels; and continuing to determine which column has the least number of pixels from the top of the search result webpage and placing another image of the plurality of images into the column with the least number of pixels until a predetermined number of images are displayed in the cascading waterfall layout.

5. The method of claim 1, wherein the structured data is presented at a position on the display, and wherein the position of the structured data on the display remains constant while a user is scrolling through rows of the plurality of images in the cascading waterfall layout.

6. The method of claim 1, wherein the cascading waterfall layout is displayed at a top portion of the search result webpage and textual search results for the query are presented below the cascading waterfall layout.

7. The method of claim 1, wherein at least one webpage of the plurality of webpages includes a video describing task details; and wherein the cascading waterfall layout includes the plurality of images and the video, wherein at least one display attribute of the video is visually distinct from display attributes of the plurality of images.

8. The method of claim 1, wherein the structure data includes one or more of the following from the webpage: steps for performing the task, step-by-step images for performing the task, a list of materials needed for performing the task, an estimated time required to complete the task.

9. The method of claim 8, wherein the structured data includes one or more of the following from sources other than the webpage: estimated cost of materials for the task, local availability of materials for the task, substitute materials for the task, or an aggregation of information from different webpages for the task.

10. The method of claim 1, wherein the search result webpage includes filter options for filtering the cascading waterfall based on the structured data associated with each image.

11. A device, comprising:
one or more processors;
memory in electronic communication with the one or more processors; and
instructions stored in the memory, the instructions executable by the one or more processors to:
receiving a query from a user, wherein the query identifies a multi-step task and comprises a request for task details for completing the task;
providing the query to a search engine;
responsive to providing the query, receiving results from the search engine, wherein the received results include identification of a plurality of webpages, wherein each webpage of the plurality of webpages includes details to complete the task;
presenting on a display a search result webpage responsive to receiving the results, the search result webpage including a plurality of images from the plurality of webpages, wherein the plurality of images are presented in a cascading waterfall layout that includes a plurality of columns by placing one image of the plurality of images into each column of the plurality of columns and continuing to place images into each column based on an available number of pixels in a column until a predetermined number of images are displayed in the cascading waterfall layout;
receiving a user selection of an image from the plurality of images; and
responsive to the user selection:
presenting, adjacent to the plurality of images on the search result webpage, structured data corresponding to the image, the structured data comprising details from the webpage to complete the task; and
adjusting the presentation of the cascading waterfall layout based on the selection of the image, wherein the adjusting includes at least one of: resizing a column of the plurality of columns, and rearranging an ordering of images within at least one column of the plurality of columns.

12. The device of claim 11, wherein the instructions are further executable by the one or more processors to adjust the presentation of the cascading waterfall layout without issuing a new search request to the search engine or changing the query from the user.

13. The device of claim 11, wherein the instructions are further executable by the one or more processors to select a number of columns for the cascading waterfall layout based on a size of the display; and
adjust the presentation of the cascading waterfall layout by reducing the number of columns displayed and rearranging a position of the plurality of images to fit within the reduced number of columns.

14. The device of claim 11, wherein the instructions are further executable by the one or more processors to display the plurality of images by:
determining which column has a least number of pixels from a top of the search result webpage;
placing a next image of the plurality of images into the column with the least number of pixels; and
continuing to determine which column has the least number of pixels from the top of the search result webpage and placing another image of the plurality of images into the column with the least number of pixels until a predetermined number of images are displayed in the cascading waterfall layout.

15. The device of claim 11, wherein the instructions are further executable by the one or more processors to present the structured data at a position on the display, and wherein the position of the structured data on the display remains constant while a user is scrolling through rows of the plurality of images in the cascading waterfall layout.

16. The device of claim 11, wherein at least one webpage of the plurality of webpages includes a video describing task details; and
wherein the cascading waterfall layout includes the plurality of images and the video, wherein at least one display attribute of the video is visually distinct from display attributes of the plurality of images.

17. The device of claim 11, wherein the structure data includes one or more of the following from the webpage: steps for performing the task, step-by-step images for performing the task, a list of materials needed for performing the task, an estimated time required to complete the task.

18. The device of claim 17, wherein the structured data includes one or more of the following from sources other than the webpage: estimated cost of materials for the task, local availability of materials for the task, substitute materials for the task, or an aggregation of information from different webpages for the task.

19. The device of claim 11, wherein the search result webpage includes filter options for filtering the cascading waterfall based on the structured data associated with each image.

20. A non-transitory computer-readable medium storing instructions executable by a computer device, comprising:
- at least one instruction for causing the computer device to receive a query from a user, wherein the query identifies a multi-step task and comprises a request for task details for completing the task;
- at least one instruction for causing the computer device to provide the query to a search engine;
- at least one instruction for causing the computer device to receive results from the search engine, responsive to providing the query, wherein the received results include identification of a plurality of webpages, wherein each webpage of the plurality of webpages includes details to complete the task;
- at least one instruction for causing the computer device to present on a display a search result webpage responsive to receiving the results, the search result webpage including a plurality of images from the plurality of webpages, wherein the plurality of images are presented in a cascading waterfall layout that includes a plurality of columns by placing one image of the plurality of images into each column of the plurality of columns and continuing to place images into each column based on an available number of pixels in a column until a predetermined number of images are displayed in the cascading waterfall layout;
- at least one instruction for causing the computer device to receive a user selection of an image from the plurality of images; and
- responsive to the user selection:
  - at least one instruction for causing the computer device to present, adjacent to the plurality of images on the search result webpage, structured data corresponding to the image, the structured data comprising details from the webpage to complete the task; and
  - at least one instruction for causing the computer device to adjust the presentation of the cascading waterfall layout based on the selection of the image, wherein the adjusting includes at least one of: resizing a column of the plurality of columns, and rearranging an ordering of images within at least one column of the plurality of columns.

* * * * *